United States Patent
Kondo

(10) Patent No.: US 9,780,724 B2
(45) Date of Patent: Oct. 3, 2017

(54) TRANSPARENT SOLAR-HEAT COLLECTING APPARATUS, SOLAR WATER HEATING SYSTEM, AND SOLAR COGENERATION SYSTEM

(71) Applicant: Hiroshi Kondo, Kanagawa (JP)

(72) Inventor: Hiroshi Kondo, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 149 days.

(21) Appl. No.: 14/834,707

(22) Filed: Aug. 25, 2015

(65) Prior Publication Data

US 2016/0065125 A1  Mar. 3, 2016

(30) Foreign Application Priority Data

Aug. 29, 2014  (JP) .................................. 2014-174666
May 28, 2015  (JP) .................................. 2015-108951

(51) Int. Cl.
| | | |
|---|---|---|
| *F24J 2/34* | (2006.01) | |
| *H02S 40/44* | (2014.01) | |
| *F24J 2/20* | (2006.01) | |
| *G02B 5/00* | (2006.01) | |
| F24J 2/04 | (2006.01) | |
| F24D 3/00 | (2006.01) | |
| F24J 2/50 | (2006.01) | |

(52) U.S. Cl.
CPC ................. *H02S 40/44* (2014.12); *F24J 2/20* (2013.01); *G02B 5/00* (2013.01); *F24D 3/005* (2013.01); *F24J 2/045* (2013.01); *F24J 2/0427* (2013.01); *F24J 2/345* (2013.01); *F24J 2002/502* (2013.01); *Y02B 10/20* (2013.01); *Y02E 10/44* (2013.01); *Y02E 10/60* (2013.01)

(58) Field of Classification Search
CPC ................. F24J 2/34; F24J 2/05; H02S 40/44
USPC .......................... 126/569, 641, 652; 136/248
See application file for complete search history.

(56) References Cited

U.S. PATENT DOCUMENTS 4,368,725 A  *  1/1983  McClintock ........... F24J 2/0433
                                                      126/595
4,509,502 A  *  4/1985  Youcha ...................... F24J 2/08
                                                      126/675

(Continued)

FOREIGN PATENT DOCUMENTS

JP       2006-78007       3/2006
JP       2011-252213     12/2011

(Continued)

*Primary Examiner* — Gregory Huson
*Assistant Examiner* — Nikhil Mashruwala
(74) *Attorney, Agent, or Firm* — Oblon, McClelland, Maier & Neustadt, L.L.P.

(57) ABSTRACT

A transparent solar heat absorbing apparatus includes a transparent member allowing sunlight to pass through, a wavelength selective member disposed beneath the transparent member, a heating tank formed between the transparent member and the wavelength selective member. The wavelength selective member allows light in a transmission range including at least a visible wavelength range to pass through and reflects light in a reflection range including at least an infrared wavelength range. At least one of the transparent member and the wavelength selective member has a waveform structure on at least one of its upper surface and bottom surface.

12 Claims, 19 Drawing Sheets

(56) References Cited

U.S. PATENT DOCUMENTS

| | | | | |
|---|---|---|---|---|
| 8,450,603 B2* | 5/2013 | Tadayon | ................ | H02S 20/30 |
| | | | | 126/573 |
| 2009/0013992 A1* | 1/2009 | Sonneveld | ........... | A01G 9/1438 |
| | | | | 126/705 |
| 2013/0240037 A1* | 9/2013 | Yui | ...................... | H01L 31/048 |
| | | | | 136/259 |
| 2013/0333693 A1* | 12/2013 | Hashimura | ............ | G02B 5/208 |
| | | | | 126/714 |
| 2015/0096552 A1 | 4/2015 | Satoh et al. | | |
| 2016/0149067 A1* | 5/2016 | Hebrink | ................. | F24J 2/1057 |
| | | | | 136/246 |

FOREIGN PATENT DOCUMENTS

| | | |
|---|---|---|
| JP | 2012-108207 | 6/2012 |
| JP | 2014-52171 | 3/2014 |
| JP | 2014-228179 | 12/2014 |

* cited by examiner

FIG.17A 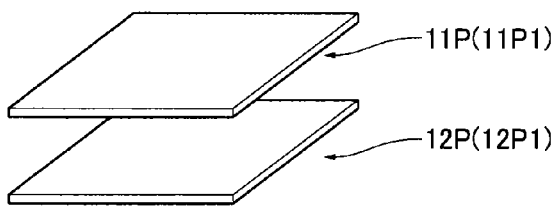 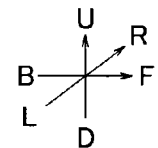
FIG.17B 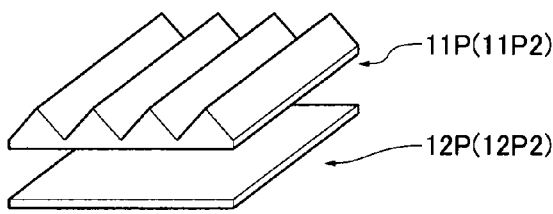 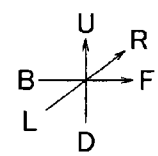
FIG.17C 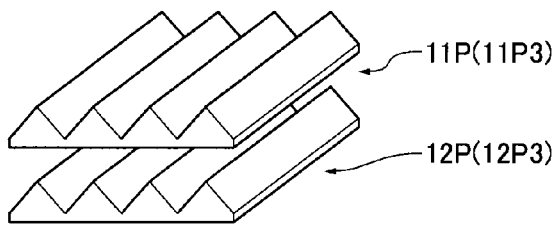 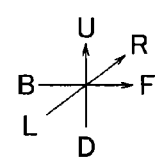
FIG.17D 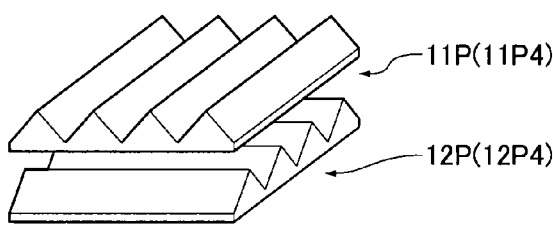 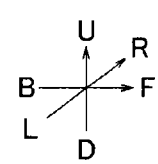
FIG.17E 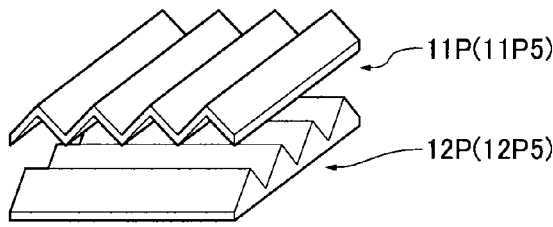 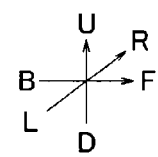

TRANSPARENT SOLAR-HEAT COLLECTING APPARATUS, SOLAR WATER HEATING SYSTEM, AND SOLAR COGENERATION SYSTEM

CROSS-REFERENCE TO RELATED APPLICATION

The present application is based on and claims priority to Japanese Patent Application No. 2014-174666, filed Aug. 29, 2014 and Japanese Patent Application No. 2015-108951, filed May 28, 2015, the disclosures of which are hereby incorporated by reference herein in its entirety.

BACKGROUND

Technical Field

This invention relates to a transparent solar heat absorbing apparatus that utilizes solar energy while allowing sunlight to pass through the apparatus, a solar water-heating system equipped with the transparent solar heat absorbing apparatus, and a solar cogeneration system equipped with the transparent solar heat absorbing apparatus.

Description of Related Art

Conventionally, a solar cell (photoelectric converter) that converts sunlight to electrical energy and a solar heat absorbing apparatus that converts sunlight into thermal energy have been known to utilize solar energy.

The solar cell converts sunlight into electrical energy (i.e., generate power) by absorbing the sunlight in a specific wavelength range. An amorphous silicon (a-Si) solar cell absorbs the sunlight in the wavelength range between about 300 nm and 700 nm, a cadmium tellurium (CdTe) solar cell absorbs the sunlight in the wavelength range between about 300 nm to 850 nm, and a copper indium gallium selenide (CIGS) solar cell absorbs the sunlight in the wavelength range between about 300 nm to 1000 nm. That is to say, solar cells can convert the sunlight into the electrical energy only in the wavelength range between about 300 to 1000 nm. In other words, the solar cells cannot effectively utilize the sunlight (solar energy) in the wavelength range between 1000 to 2500 nm (i.e., near infrared light). Hence, the energy conversion efficiency of the solar cell (photoelectric converter) is not sufficiently high. Note that a single crystal silicon (single crystal-Si) solar cell can convert the sunlight in the wavelength range greater than 1000 nm but is expensive and difficult to increase the size.

For the near infrared light (in the wavelength range approximately between 700 and 2500 nm), it is generally more effective to convert it into the thermal energy rather than into the electrical energy. Therefore, it is common to use a solar heat absorbing apparatus to convert the near infrared light (solar energy thereof) into the thermal energy. As is known, a solar water heating device can convert the near infrared light of the sunlight (solar energy thereof) into the thermal energy and generate heated water with the converted thermal energy, for example. However, since the color of the solar water heating device (solar heat absorbing apparatus) is commonly black, it is not preferable to install the solar water heating device on a certain place, such as a transparent roof of a balcony used for daylighting and for rain cover and a balcony with a glass handrail or with a glass fence. Hence, the installation places of the device are limited. Further, when a photoelectric converter (solar cell) is provided next to the solar water-heating device (solar heat absorbing apparatus) to obtain more energy from the sunlight, both the solar water-heating device and the photoelectric converter require installation places respectively, resulting in an increase of the installation space.

To overcome the drawbacks, a solar system has been taught by Japanese Laid-Open Patent Application No. 2006-078007. In this solar system, a solar water hearting device (solar heat absorbing apparatus) allows a part of the sunlight to pass through the device and is installed on top of a photoelectric converter (solar cell). Further, the solar water-heating device and the photoelectric converter are integrally supported by an outer frame. Specifically, the solar water-heating device includes a water tank, and the bottom and top parts of the water tank are formed of transparent materials. Further, the inside of the water tank is divided into a plurality of areas by a plurality of partition panels. In the solar water-heating device, the water in the tank absorbs thermal energy of the sunlight (mainly, the near infrared light thereof) to heat the water with the absorbed thermal energy as the sunlight passes through the water in the tank. This conventional solar system can also generate power with the photoelectric converter by using the sunlight having passed through the solar water-heating device while heating the water by using the solar water-heating device. As a result, the conventional solar system can utilize wider wavelength ranges of the sunlight to obtain energy compared to the system equipped only with a solar water-heating device or a photoelectric converter. In other words, the conventional solar system can improve the conversion efficiency of the solar energy. Further, since the solar water-heating device of the conventional solar system allows the part of the sunlight to pass through, the solar water-heating device can be disposed on top of the photoelectric converter. With this, it can prevent an increase of the installation space.

SUMMARY

However, the conventional solar system is not suitable to efficiently absorb the thermal energy with the solar water-heating device. To be specific, water can efficiently absorb the sunlight in the wavelength range equal to or greater than 2000 nm but cannot in the wavelength range smaller than 2000 nm (especially, the absorption rate in the wavelength range between 1000 to 1350 nm is relatively small). For example, the absorption rate of 10 mm of water relative to the wavelength range of about 1100 nm is about 20%. On the other hand, the intensity of the sunlight becomes high in the wavelength range between 1000 to 1350 nm. Since the solar water heating device of the conventional solar system cannot efficiently absorb the sunlight in the wavelength range between 1000 to 1350 nm, the system cannot efficiently absorb the thermal energy from the sunlight. Therefore, an improvement of the conventional system to increase the energy conversion efficiency is expected.

Additionally, when the water depth of the solar water-heating device (the water tank thereof) of the conventional solar system is 10 mm, the weight of the water tank is about 10 kg/m$^2$, i.e., as heavy as a common solar cell. That is to say, the load on the outer frame, which integrally supports the solar water-heating device and the photoelectric converter, becomes double in the conventional solar system. Therefore, it is preferable to reduce the weight of the solar water-heating device (the water tank). To reduce the weight, the water depth in the conventional solar system may be reduced. However, along with a decrease in the water depth, the optical path length of the sunlight in the water inside the water tank becomes shorter, resulting in a decrease of the absorption rate of the thermal energy (i.e., resulting in a decrease of the energy conversion efficiency).

An object of the present invention is, therefore, to provide a transparent solar heat absorbing apparatus that can efficiently absorb thermal energy from the sunlight by allowing a part of sunlight to pass through the apparatus while reducing the weight of the apparatus.

To achieve the above object, an aspect of the present invention provides a transparent solar heat absorbing apparatus that includes a transparent member that allows sunlight to pass through, a wavelength selective member disposed beneath the transparent member, the wavelength selective member allowing light in a transmission range including at least a visible wavelength range to pass through and reflecting light in a reflection range including at least an infrared wavelength range, and a heating tank formed between the transparent member and the wavelength selective member, the heating tank being filled with a heating medium. Here, at least one of the transparent member and the wavelength selective member has a waveform structure on at least one of its upper surface and bottom surface.

BRIEF DESCRIPTION OF DRAWINGS

FIG. 17A is a schematic view illustrating a first pattern of the transparent member and the wavelength selective member of the multiple-reflection evaluator;

FIG. 17B is a schematic view illustrating a second pattern of the transparent member and the wavelength selective member of the multiple-reflection evaluator;

FIG. 17C is a schematic view illustrating a third pattern of the transparent member and the wavelength selective member of the multiple-reflection evaluator;

FIG. 17D is a schematic view illustrating a fourth pattern of the transparent member and the wavelength selective member of the multiple-reflection evaluator;

FIG. 17E is a schematic view illustrating a fifth pattern of the transparent member and the wavelength selective member of the multiple-reflection evaluator;

DETAILED DESCRIPTION

Hereinafter, embodiments of a transparent solar heat absorbing apparatus, a solar water-heating system equipped with the transparent solar heat absorbing apparatus, and a solar cogeneration system equipped with the transparent solar heat absorbing apparatus according to the present invention will be explained with reference to the drawings.

Figure 1:
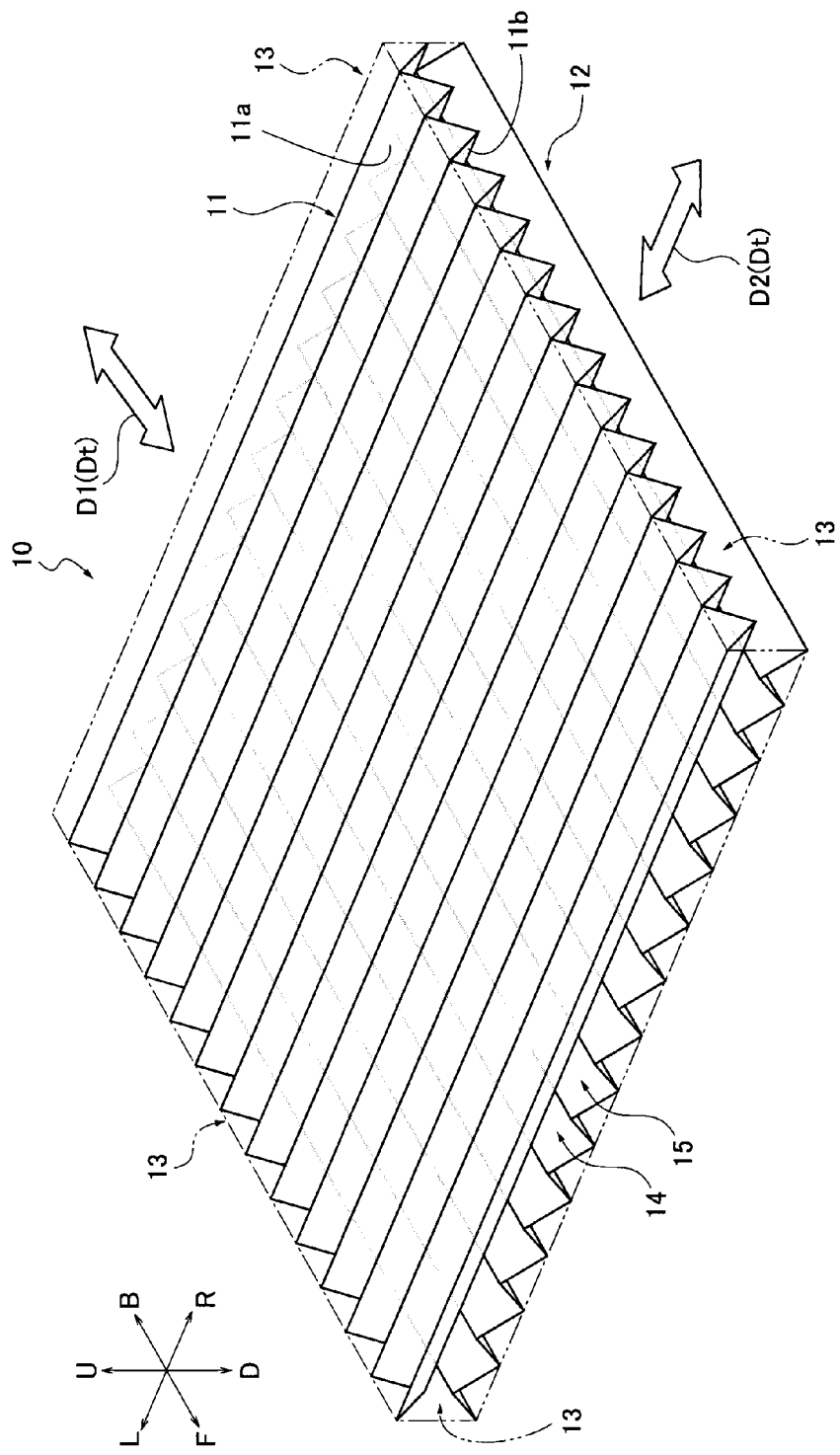
FIG. 1 is a schematic view illustrating an overall configuration of an example of a transparent solar heat absorbing apparatus of the present invention.
Figure 2A:
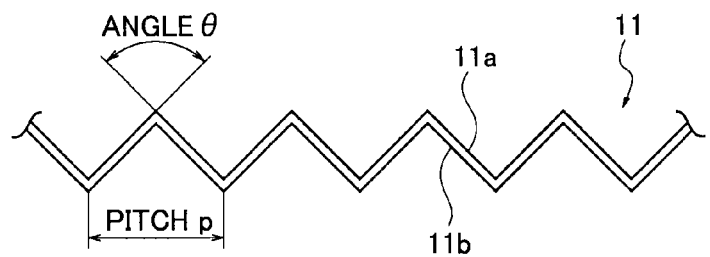
FIG. 2A is an explanatory view illustrating a shape of a transparent member of the transparent solar heat absorbing apparatus.
Figure 2B:
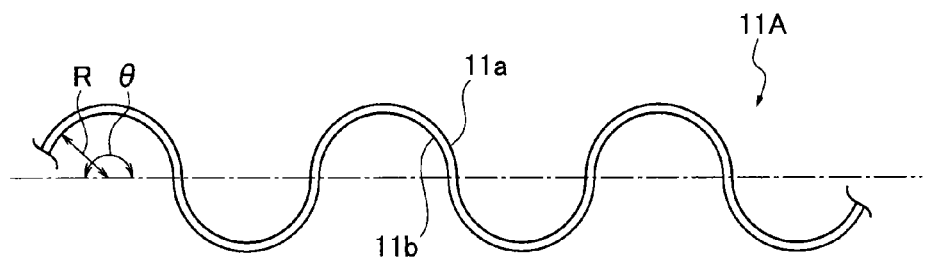
FIG. 2B is an explanatory view illustrating a shape of another example of the transparent member of the apparatus.
Figure 3:
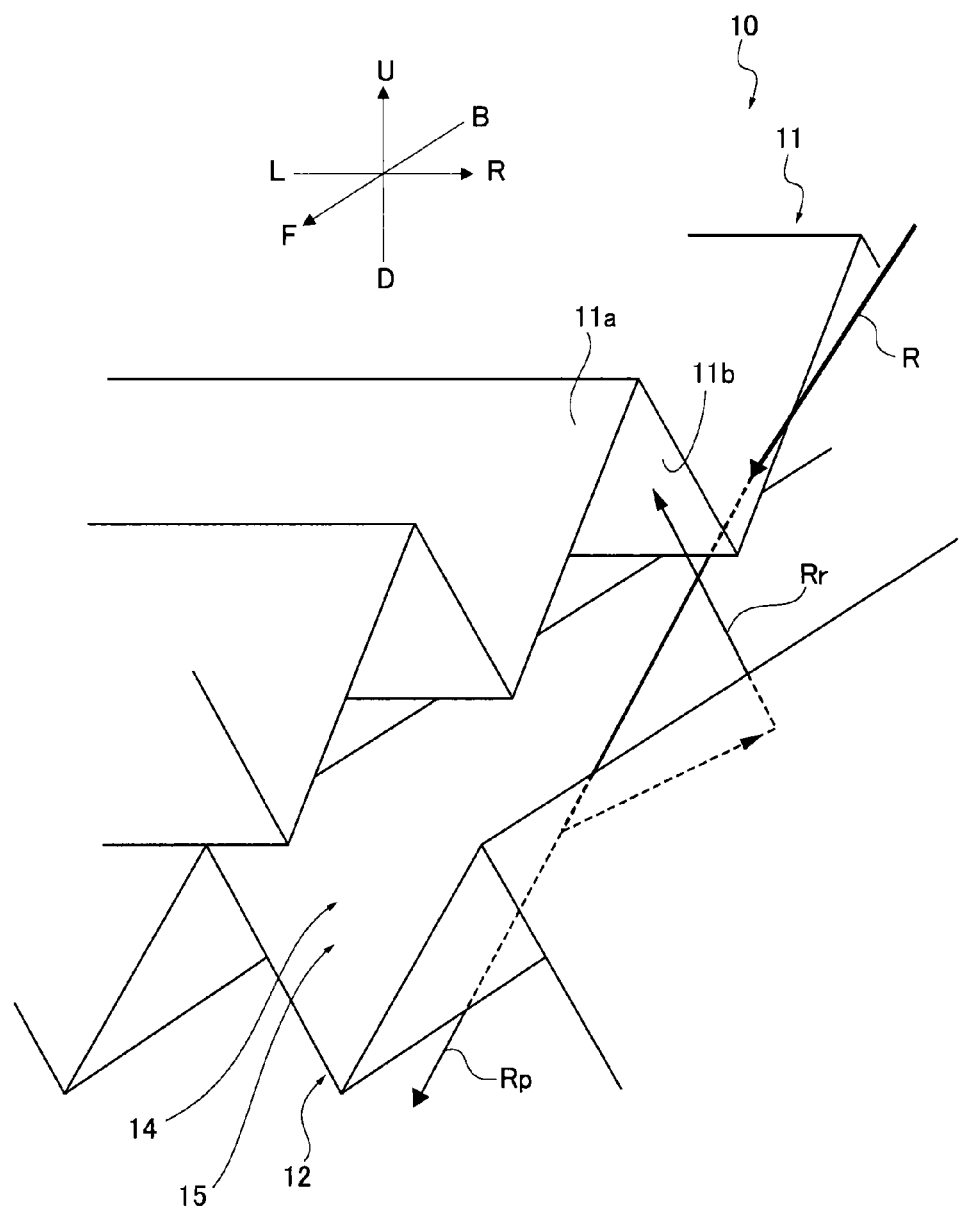
FIG. 3 is an explanatory view schematically illustrating sunlight emitted to a heating tank.
Figure 4:
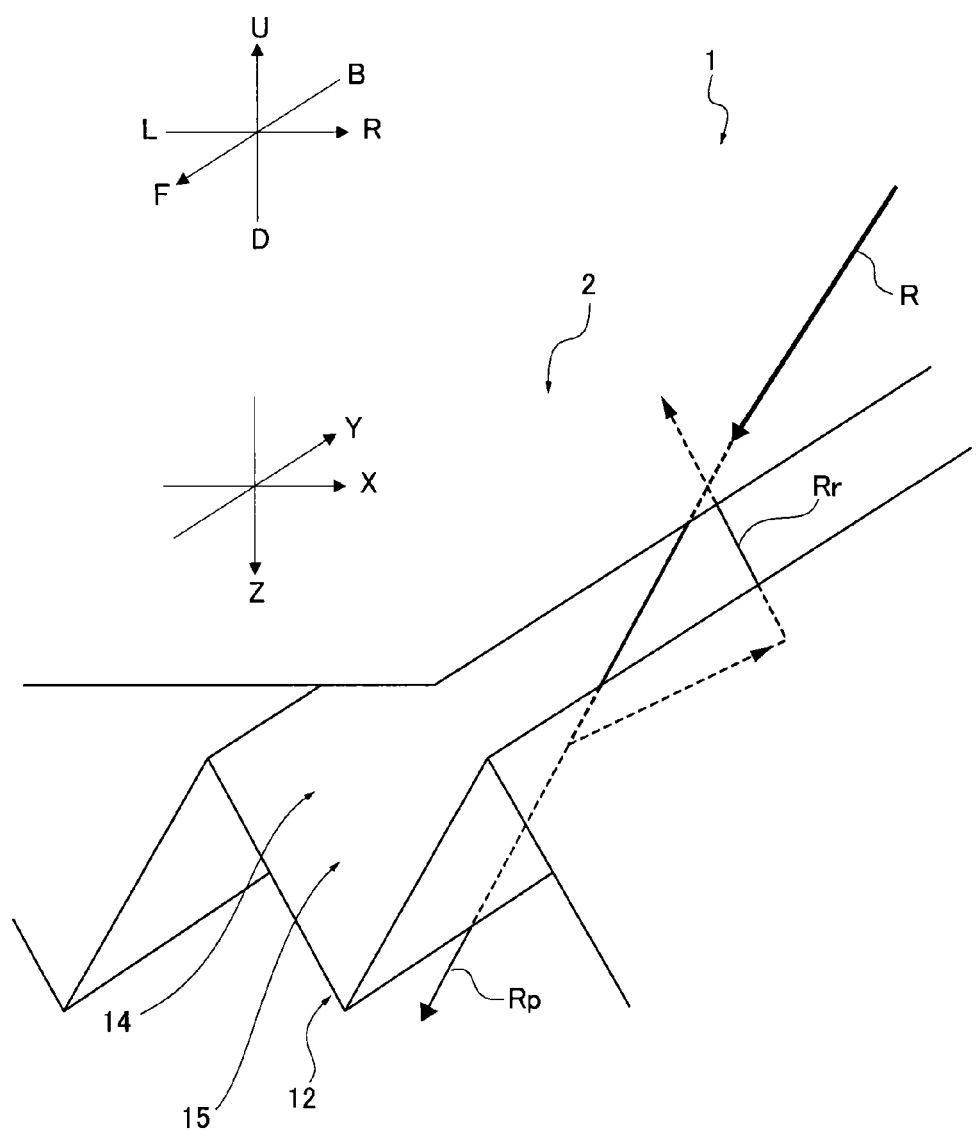
FIG. 4 is an explanatory view similar to FIG. 3, but illustrating the sunlight emitted to the heating tank when a transparent member has a flat surface.

Here, a basic concept of the transparent solar heat absorbing apparatus according to the embodiments of the present invention will be explained with reference to FIGS. 1 to 7. FIG. 1 is a schematic view illustrating an overall configuration of a transparent solar heat absorbing apparatus 10. In this specification, the direction shown by the arrow UD is the up-and-down direction (the side of "U" is the upside), the direction shown by the arrow FB, which is orthogonal to the up-and-down direction, is the front-and-back direction (the side of "F" is the front side), and the direction shown by the arrow LR, which is orthogonal to the up-and-down direction and front-and-back direction, is the left-and-right direction (the side of "R" is the right side), as illustrated in FIG. 1. Here, to facilitate understanding the configuration of the transparent solar heat absorbing apparatus 10, side wall plates 13 are illustrated by two-dot chain lines. In FIGS. 3 and 4, to facilitate understanding how the sunlight R is emitted to a heating tank 14, only a part of a transparent member 11 and a wavelength selective member 12 are illustrated and the side wall plates 13 are omitted.

The transparent solar heat absorbing apparatus 10 includes the heating tank 14 having the transparent member 11, the wavelength selective member 12, and the side wall plates 13. The heating tank 14 of the apparatus 10 is filled with a heating medium 15. The apparatus 10 obtains thermal energy from the sunlight by absorbing the thermal energy of the sunlight with the heating medium 15. The apparatus 10 allows visible light of the sunlight to pass through the apparatus 10. In the apparatus 10, at least one of the transparent member 11 and wavelength selective member 12 has a waveform structure on at least one of an upper surface and a bottom surface thereof. Hereinafter, preferable examples of the transparent member 11 and the wavelength selective member 12 will be explained.

The transparent member 11 is formed by a light transmitting member and is a plate-like member. The transparent member 11 has a waveform structure in a cross sectional view (first cross sectional view, i.e., a view from the YZ-plane shown in FIG. 4) in the up-and-down direction. To be specific, at least one of an upper surface 11a or a bottom surface 11b of the transparent member 11 has the waveform structure in the first cross sectional view. The waveform structure has a plurality of projecting and recessing sections with a specific pitch. The traveling direction of the waveform (when assuming that the waveform structure is a traveling wave) is defined as a pseudo traveling direction Dt. As explained later, the transparent member 11 has the waveform structure to cause total reflection at the interface. Here, the interface that can cause the total reflection varies in accordance with the refractive index of the transparent member 11 and the refractive index of the heating medium 15. Accordingly, when the refractive index of the transparent member 11 is greater than the refractive index of the heating medium 15, at least the upper surface 11a, which forms an interface with air, has the waveform structure. On the other hand, when the refractive index of the transparent member 11 is less than the refractive index of the heating medium 15, at least the bottom surface 11b, which forms the interface with the heating medium 15, has the waveform structure.

In the example illustrated in FIG. 1, the transparent member 11 has the refractive index of 1.6 and is made of a Polyethylene Terephthalate (PET) film (a flat plate member) with a thickness about or less than 0.2 mm. Further, the transparent member 11 has a rectangular shape in a plane view. As illustrated in FIG. 2A, the projected folds and recessed folds of the transparent member 11 are aligned in parallel with an equal interval. In other words, the angles θ at the projected folds and the recessed folds are equal to each other, and the oblique side lines forming the angles θ have the same length. That is to say, the waveform is a triangular waveform. As illustrated in FIG. 1, both the upper surface 11a and the bottom surface 11b have the triangular waveform structures, and the upper surface 11a and the bottom surface 11b are arranged to be in parallel to each other. Further, the pseudo traveling direction Dt of the folds of the transparent member 11 correspond to the left-and-right direction, and is defined as a first direction D1.

The angles θ and the pitches p of the transparent member 11 are determined based on the refractive index of the transparent member 11 and the refractive index of the heating medium 15 so as to generate more multiple reflections inside the heating tank 14 located between the transparent member 11 and the wavelength selective member 12 (explained later). In the transparent member 11 of this example, the angles θ are 90°.

Although the waveform structure of the transparent member 11 illustrated in FIGS. 1 and 2A is formed of the projected folds and recessed folds (i.e., triangular waveform), the waveform should not be limited thereto. For example, the waveform may be a semicircular shape as illustrated in FIG. 2B (transparent member 11A). The transparent member 11A is formed with the curves defined by the radius R and opening angle θ. Note that the radiuses R and the opening angles θ of the transparent member 11A are appropriately determined in the same manner as the transparent member 11.

Figure 2C:
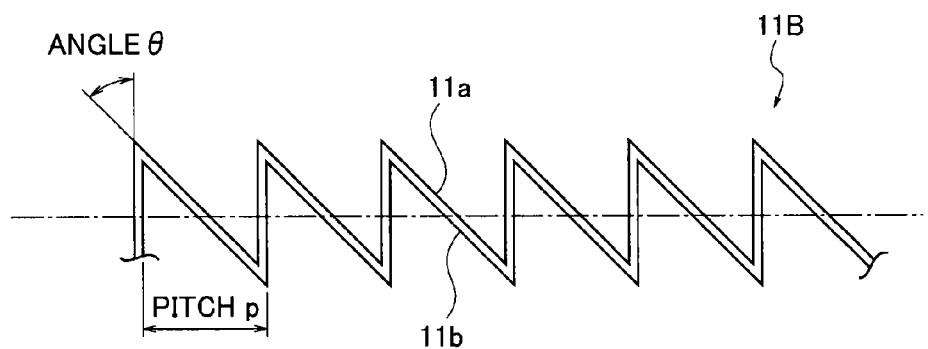
FIG. 2C is an explanatory view illustrating a shape of another example of the transparent member of the apparatus.

Further, the waveform structure may be formed by folding the PET film so as to align vertical lines and oblique lines alternatively in the cross sectional view as illustrated in FIG. 2C (transparent member 11B). The acute angles θ and the pitches p between the vertical lines of the transparent member 11B are appropriately determined, thereby forming sawtooth shape.

The wavelength selective member 12 allows the light in a predetermined wavelength range (transmission range) to pass through and reflects the light in a prescribed wavelength range (reflection range). The wavelength selective member 12 has a waveform structure in a cross sectional view (second cross sectional view, i.e., a view from the XZ-plane shown in FIG. 4) in the up-and-down direction. To be specific, at least one of an upper surface or a bottom surface of the wavelength selective member 12 has the waveform structure in the second cross sectional view. Here, the transmission range and the reflection range are different from each other. Specifically, the reflection range is substantially the same as the infrared wavelength range, and the wavelength range having shorter wavelength than the reflection range is set to be the transmission range. Namely, the transmission range of the wavelength selective member 12 includes the visible wavelength range. As a result, the infrared light is substantially reflected by the wavelength selective member 12 and the visible light is allowed to pass therethrough.

The wavelength selective member 12 illustrated in FIG. 1 is formed by covering the PET film with a coating film of silver iodide tabular grains and forms a rectangular shape in a plane view. Note that the coating film of the silver iodide tabular grains may be formed by conventional techniques (e.g., Japanese Laid-Open Patent Application No. 2011-252213, and No. 2012-108207), and the detailed explanation thereof will be omitted. Here, the maximum transmissive wavelength of the wavelength selective member 12 is set to be 1015 nm. That is to say, any light having the wavelength range of greater than 1015 nm, in which the infrared light is included, is reflected by the wavelength selective member 12. The light having the wavelength range of shorter than 1015 nm, in which the visible light is included, is allowed to pass through the wavelength selective member 12. Note that the coating film of the silver iodide tabular grains covers the waveform surface.

The projected folds and recessed folds of the transparent member 11 illustrated in FIG. 1 are aligned in parallel with an equal interval. In other words, the angles θ at the projected folds and the recessed folds are identical to each other, and the oblique side lines forming the angles θ have the same length. Similar to the transparent member 11 (illustrated in FIG. 2A), the wavelength selective member 12 has the waveform structures on both the upper surface and the bottom surface thereof and the upper surface and the bottom surface are aligned in parallel. Further, the pseudo traveling direction Dt of the folds of the wavelength selective member 12 corresponds to the front-and-back direction and is defined as a second direction D2. As illustrated, the first direction D1 corresponding to the pseudo traveling direction Dt of the transparent member 11 is orthogonal to the second direction D2 corresponding to the pseudo traveling direction Dt of the wavelength selective member 12.

The angles θ and the pitches p of the wavelength selective member 12 are determined so as to generate more multiple reflections inside the heating tank 14 located between the transparent member 11 and the wavelength selective member 12 (explained later). In this embodiment, each angle and each length of the oblique side line forming the wave shape of the wavelength selective member 12 are equal to each angle and each length of the oblique side line forming the wave shape of the transparent member 11. Note that the angles and the lengths of the oblique side lines of the wavelength selective member 12 may be changed to be different from those of the transparent member 11.

Although the waveform of the wavelength selective member 12 of this embodiment is formed with the projected folds and recessed folds (i.e., triangular waveform), the waveform should not be limited thereto. For example, the waveform may have a semicircular shape as illustrated in FIG. 2B, or may be formed by folding the PET film so as to align vertical lines and oblique lines alternatively as illustrated in FIG. 2C. The transparent member 11 and the wavelength selective member 12 are disposed at substantially the same area in the plane view, i.e., the sizes are substantially the same. The side wall plates 13 surround four sides of the wavelength selective member 12 and the transparent member 11. Note that the shape of the wavelength selective member 12 may be different from the shape of the transparent member 11 as long as the pseudo traveling directions Dt of the wavelength selective member 12 and transparent member 11 are orthogonal to each other and the heating tank 14 located between the transparent member 11 and wavelength selective member 12 generates more multiple reflections than the ones of the conventional techniques.

The side wall plates 13 illustrated in FIG. 1 are respectively disposed at the four side surfaces of the transparent member 11 and wavelength selective member 12. These four side wall pates 13 are respectively connected to each other at their edges. The side wall plates 13 form the heating tank 14 together with the transparent member 11 and the wavelength selective member 12 in between the transparent member 11 and the wavelength selective member 12.

Each of the side wall plates 13 is formed of the member that reflects light in the reflection range. Thus, the side wall plates 13 prevent the light in the reflection range from leaking from the heating tank 14 so as to secure the multiple reflections in the heating tank 14. Further, each of the side wall plates 13 is formed of the member that allows the light in the transmission range to pass through. Thus, the side wall plates 13 can allow the light in the transmission range to advance to the wavelength selective member 12, thereby improving the entire transmission performance for the visible light. Similar to the wavelength selective member 12, the side wall plates 13 are formed by covering the PET film with the coating film of the silver iodide tabular grains.

As explained, the heating tank 14 is formed in the space between the transparent member 11 and the wavelength selective member 12 and is sealed by the side wall plates 13. The heating tank 14 can be filled with the heating medium 15. The sunlight passes through the transparent member 11 to inside the heating tank 14. The sunlight in the transmission range then passes through the wavelength selective member 12 toward the outside. The sunlight in the reflection range is, on the other hand, reflected by the wavelength selective member 12 and returned to the inside of the heating tank 14. When the sunlight is emitted to the transparent solar heat absorbing apparatus 10 from the upside, the heating tank 14 absorbs the thermal energy with the heating medium 15 from the sunlight (solar energy). Besides, the part of the sunlight passes through the heating tank 14. Note that the heat capacity of the heating tank 14 is adjustable by modifying the distance between the transparent member 11 and the wavelength selective member 12 in the up-and-down direction.

The heating medium 15 filing the heating tank 14 can effectively absorb the thermal energy from the sunlight (solar energy). Specifically, the heating medium 15 is water or a fluid containing water. The heating medium 15 allows at least the visible light, i.e., the light in the wavelength equal to or shorter than about 700 nm, to pass through and absorbs the infrared light, i.e., the light of the wavelength substantially equal to or greater than 1000 nm. Note that in this specification, the term "passing through" does not have to mean that the light transmissivity is 100%. Unless the light transmissivity of a medium is 0%, the medium may be used as the heating medium 15. Further, in this specification, the term "absorbing the infrared light" does not have to mean that the absorption rate of the infrared light is 100%. Unless the absorption rate of a medium is 0%, the medium may be used as the heating medium 15. Further, the heating medium 15 may absorb the near-infrared light, i.e., the light of the wavelength equal to or greater than 700 nm. The heating medium 15 can absorb the thermal energy from the sunlight that has passed through the transparent member 11, entered inside the heating tank 14 and been reflected by the wavelength selective member 12 (i.e., the light in the reflection range).

As explained above, since the transparent member 11 of the transparent solar heat absorbing apparatus 10 allows the sunlight R to pass through, the sunlight R emitted to the apparatus 10 advances to the heating medium 15 of the heating tank 14 through the transparent member 11, as illustrated in FIG. 3. The sunlight R then advances through inside the heating medium 15 of the heating tank 14 downward. When the sunlight R reaches the wavelength selective member 12, the sunlight R in the reflection range (hereinafter called "reflective sunlight Rr") is reflected by the wavelength selective member 12 and the sunlight R in the transmission range (hereinafter called "transmissive sunlight Rp") passes through the wavelength selective member 12.

Here, the transmission range of the wavelength selective member 12 is determined to include the visible wavelength range and to be shorter than 1015 nm. Accordingly, the transparent solar heat absorbing apparatus 10 has a transparent appearance. Further, the reflection range of the wavelength selective member 12 is determined to include the infrared wavelength range and to be greater than 1015 nm. Accordingly, the apparatus 10 can prevent the reflective sunlight Rr from leaking from the heating tank 14 (i.e., the heating medium 15). As illustrated, the reflective sunlight Rr, which has been reflected by the wavelength selective member 12 twice, advances upward inside the heating medium 15 of the heating tank 14 and then advances toward the transparent member 11.

As explained above, at least one of the transparent member 11 and wavelength selective member 12 of the apparatus 10 has the waveform structure on at least one of the upper surface and the bottom surface thereof. Accordingly, the reflective sunlight Rr having been reflected by the wavelength selective member 12 is further reflected by the transparent member 11, thereby generating multiple-reflections between the transparent member 11 and the wavelength selective member 12. In particular, the apparatus 10 of the first embodiment is configured as explained above so as to generate the multiple-reflections efficiently.

In the apparatus 10, both the upper surface 11a and the bottom surface 11b of the transparent member 11 have waveforms in the first cross-sectional view, and both the upper surface and the bottom surface of the wavelength selective member 12 have waveforms in the second cross-sectional view. Further, the pseudo traveling direction Dt of the transparent member 11 is orthogonal to the pseudo traveling direction Dt of the wavelength selective member 12. Furthermore, the reflective sunlight Rr that has been reflected by the wavelength selective member 12 is further reflected by the transparent member 11, thereby generating multiple-reflections between the transparent member 11 and the wavelength selective member 12.

To be specific, the angle of the reflective sunlight Rr with respect to the horizontal surface in the side view (i.e., the view in the front-and-back direction) can be adjusted by appropriately determining the angles θ and the pitches p of the wavelength selective member 12. In the example of the transparent solar heat absorbing apparatus 10, the angles θ of the wavelength selective member 12 are set to be 90 degrees (as illustrated in FIG. 2A). Accordingly, when the sunlight is reflected by the both surfaces provided across the angle θ, the reflective sunlight Rr is retro-reflected. Therefore, in this example, the angle of the reflective sunlight Rr with respect to the horizontal surface as viewing from the front-and-back direction is determined to be equal to the angle of the sunlight R entering into the heating medium 15 of the heating tank 14.

As explained above, the advancing direction of the reflective sunlight Rr is adjusted by the wavelength selective member 12 and advances to the transparent member 11. Here, FIG. 4 shows a transparent solar heat absorbing apparatus 1 that includes a transparent member 2 having a flat surface. Note that the same configurations as the transparent solar heat absorbing apparatus 10 are indicated by the same reference characters. Further, the left-and-right direction is defined as X-axis direction (right side is the positive side), the front-and-back direction is defined as Y-axis direction (back side is the positive side), and the up-and-down direction is defined as Z-axis direction (downside is the positive side). The transparent member 2, which has the flat surface, is defined with an XY-plane. In the transparent solar heat absorbing apparatus 1, the sunlight R enters into the heating medium 15 of the heating tank 14, and the reflective sunlight Rr, which has been reflected by the wavelength selective member 12, advances to the transparent member 2. The point at which the reflective sunlight Rr returns to the transparent member 2 is defined as the origin of the XYZ coordinates (illustrated in FIG. 5).

Figure 5:
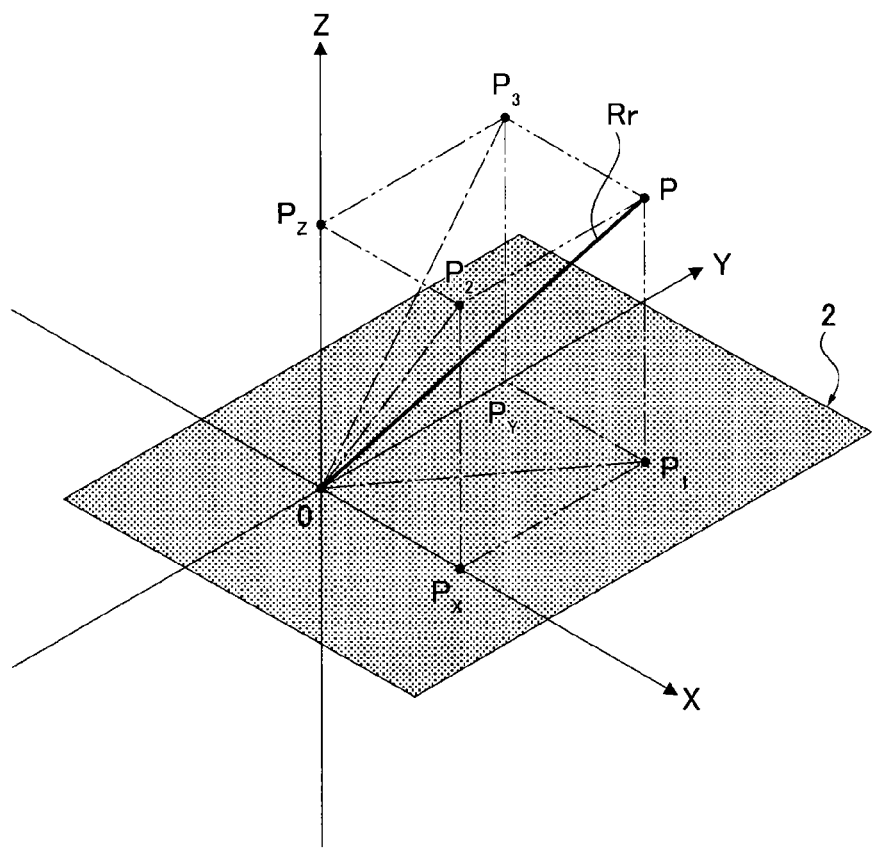
FIG. 5 is an explanatory view illustrating reflected sunlight advancing to the transparent member of FIG. 4 in XYZ orthogonal coordinate system.

FIG. 5 shows an example of the reflective sunlight Rr in the XYZ coordinates. The reflective sunlight Rr of this example advances from the point P ($P_X$=3, $P_Y$=4, $P_Z$=5) to the origin ($P_X$=0, $P_Y$=0, $P_Z$=0), i.e., to the transparent member 2. Note that a point $P_1$ represents the point P on the XY-plane, a point $P_2$ represents the point P on the XZ-plane, and a point $P_3$ represents the point P on the YZ-plane.

When the heating medium 15 is water, the refractive index of the heating medium 15 (i.e., 1.33) is smaller than the refractive index of the transparent member 2 (i.e., 1.6). Further, the refractive index of the transparent member 2 is greater than the refractive index of air (i.e., 1.00). Therefore, by using water as the heating medium 15, the reflective sunlight Rr, which advances inside the heating medium 15 toward the transparent member 2, may be totally reflected by the interface (upper surface 11a) between the transparent member 2 and the air. However, the incidence angle of the reflective sunlight Rr with respect to the interface needs to be equal to or greater than the critical angle (i.e., 38.68 degrees) to cause the total reflection. To achieve that, the reflective sunlight Rr needs to advance to the transparent member (to be specific, the bottom surface 11b thereof) at the angle equal to or greater than 48.75 degrees with respect to a line perpendicular to the bottom surface 11b. Note that the angle with respect to the line perpendicular to the bottom surface 11b, which defines the threshold value to cause the total reflection at the interface (upper surface 11a), is hereinafter called a pseudo critical angle in this specification. However, the incidence angle of the reflective sunlight Rr illustrated in FIG. 5 is smaller than the pseudo critical angle (i.e., 48.75 degrees). Precisely, the incidence angle of the reflective sunlight Rr with respect to the transparent member 2 (bottom surface 11b), i.e., the angle $\angle POP_1$, is 45 degrees. As a result, the reflective sunlight Rr illustrated in FIG. 5 is not totally reflected by the interface (upper surface 11a) and advances to outside (to the air) through the transparent member 2.

Figure 6:
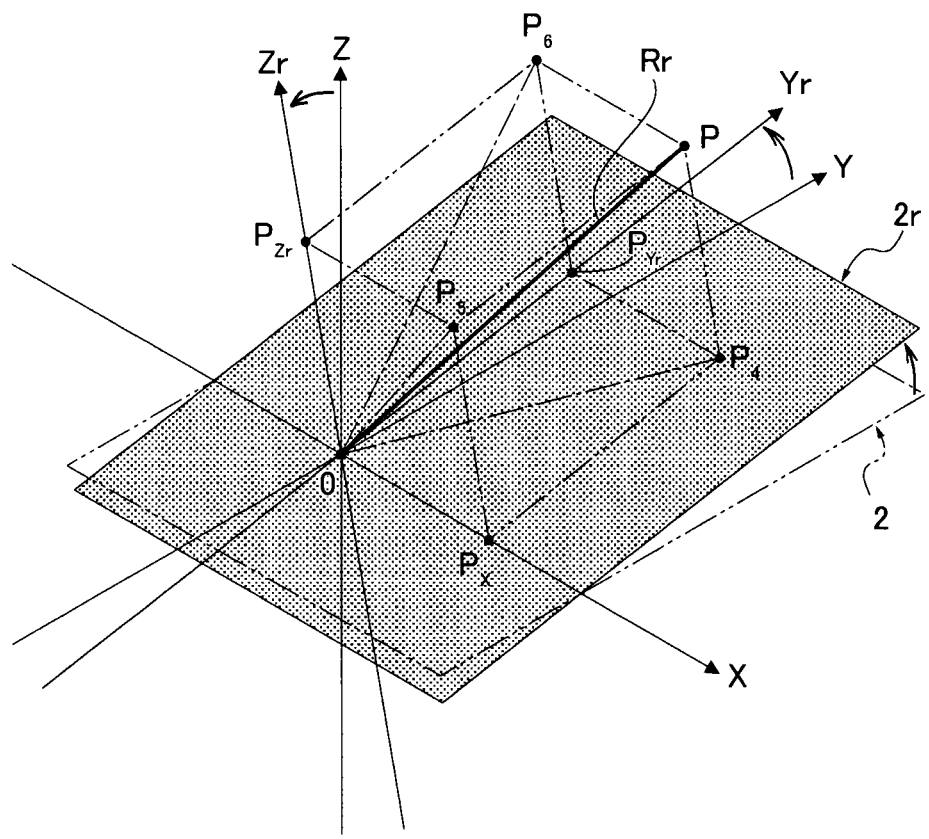
FIG. 6 is an explanatory view similar to FIG. 5, but illustrating the reflected sunlight advancing to the transparent member when the transparent member is rotated around the X-axis.

Here, the incidence angle of the reflective sunlight Rr against the transparent member 2 (bottom surface 11b (i.e., XY-plane)) is correlated with the incidence angle of the reflective sunlight Rr with respect to the XY-plane in the XZ-plane view and the incidence angle of the reflective sunlight Rr with respect to the XY-plane in the YZ-plane view. In this example illustrated in FIG. 5, the angle ($\angle P_2OP_X$) of the reflective sunlight Rr with respect to the X-axis (XY-plane (transparent member 2)) on the XZ-plane is 59.04 degrees, and the incidence angle of the reflective sunlight Rr with respect to the Z-axis (the line perpendicular to the XY-plane) on the XZ-plane, therefore, is 30.96 degree. The angle ($\angle P_3OP_Y$) of the reflective sunlight Rr with respect to the Y-axis (XY-plane (transparent member)) on the YZ-plane is 51.34 degrees, and the incidence angle of the reflective sunlight Rr with respect to the Z-axis (the line perpendicular to the XY-plane) on the YZ-plane, therefore, is 38.66 degrees. That is to say, the incidence angle of the reflective sunlight Rr against the transparent member 2 (bottom surface 11b) (i.e., (45 degrees)) is greater than the incidence angle on the XZ-plane (i.e., 30.96 degrees) and the incidence angle on the YZ-plane (i.e., 38.66 degrees) respectively. As explained, the incident angle of the reflective sunlight Rr against the transparent member 2 (bottom surface 11b) is respectively correlated with the incidence angles on the XZ-plane and on the YZ-plane. Hence, by increasing one of the incidence angles on the XZ-plane and on the YZ-plane, the incidence angle of the reflective sunlight Rr against the transparent member 2 increases. FIG. 6 shows the increased incidence angle.

In FIG. 6, the XY-plane (transparent member 2) is rotated around the X-axis without moving the reflective sunlight Rr to shift to an XYr-plane. Here, the rotated transparent member 2 is indicated as a transparent member 2r. Accordingly, the transparent member 2r is defined with an XYr-plane. In FIG. 6, the angle between the XY-plane and the XYr-plane is 10 degrees (i.e., the angle of the inclination of the Yr-axis with respect to the Y-axis is 10 degrees, and the angle of the inclination of the Zr-axis with respect to the Z-axis is 10 degree). In other words, the transparent member 2 is rotated around the X-axis by 10 degree such that the incidence angle of the reflective sunlight Rr with respect to the transparent member 2r becomes greater than the incidence angle of the reflective sunlight Rr with respect to the transparent member 2. Note that a point $P_4$ represents the point P on the XYr-plane, a point $P_5$ represents the point P on the XZr-plane, and a point $P_6$ represents the point P on the YrZr-plane.

Here, the angle ($\angle POP_4$) of the reflective sunlight Rr with respect to the transparent member 2r (bottom surface 11b) is 36.75 degree, and the incidence angle of the reflective sunlight Rr with respect to the Zr-axis on the XYr-plane (transparent member 2r), therefore, is 53.25 degree. That is to say, the incidence angle against the transparent member 2r becomes greater than the pseudo critical angle (i.e., 48.75 degree). As a result, the reflective sunlight Rr is totally reflected by the interface (upper surface 11a) between the transparent member 2r and the air, and advances inside the heating medium 15 of the heating tank 14 without leaking outside (to the air).

As explained above, by increasing one of the incidence angles on the XZ-plane and the YZ-plane, the incidence angle of the reflective sunlight Rr against the transparent member 2 (bottom surface 11b) is increased.

On the transparent member 2r (bottom surface 11b) illustrated in FIG. 6, the angle ($\angle P_5OP_X$) of the reflective sunlight Rr on the XZr-plane is 54.65 degree, and the incidence angle of the reflective sunlight Rr with respect to the Z-axis (i.e., the line perpendicular to the XYr-plane) on the XZr-plane, therefore, is 35.35 degree. Further, the angle ($\angle P_6OP_{Yr}$) of the reflective sunlight Rr on the YrZr-plane is 41.34 degree, and the incidence angle of the reflective sunlight Rr with respect to the Z-axis on the YrZr-plane, therefore, is 48.66 degree. That is to say, both of the incidence angles of the reflective sunlight Rr against the transparent member 2r (bottom surface 11b) on the XZr-plane (i.e., 35.35 degree) and on the YrZr-plane (i.e., 48.66 degree) are smaller than the pseudo critical angle (i.e., 48.75 degree). However, even if both of the incidence angles of the reflective sunlight Rr against the transparent member 2r on the XZr-plane and on the YrZr-plane are smaller than the pseudo critical angle, the incidence angle of the reflective sunlight Rr against the transparent member 2r can be greater than the pseudo critical angle.

The transparent solar heat absorbing apparatus 10 of the embodiment is configured based on the above explained concept. Namely, the projected folds and recessed folds of the transparent member 11 form the waveform extending along the left-and-right side to adjust the incidence angle of the reflective sunlight Rr on the YZ-plane. Further, the incidence angle of the reflective sunlight Rr on the XZ-plane is adjusted by the wavelength selective member 12. By assuming that the reflective sunlight Rr advances (returns) to the transparent member 11 (illustrated in FIG. 4), the apparatus 10 decreases the angle of the transparent member 11 with respect to the reflective sunlight Rr, thereby increasing the incidence angle of the reflective sunlight Rr against the YZ-plane to more than the pseudo critical angle. Accordingly, the transparent member 11 has the inclined faces normally rotated around the X-axis and the inclined faces reversely rotated around the X-axis alternatively along the Y-axis direction so as to decrease the angle of the reflective sunlight Rr with respect to the transparent member 11.

Figure 7:
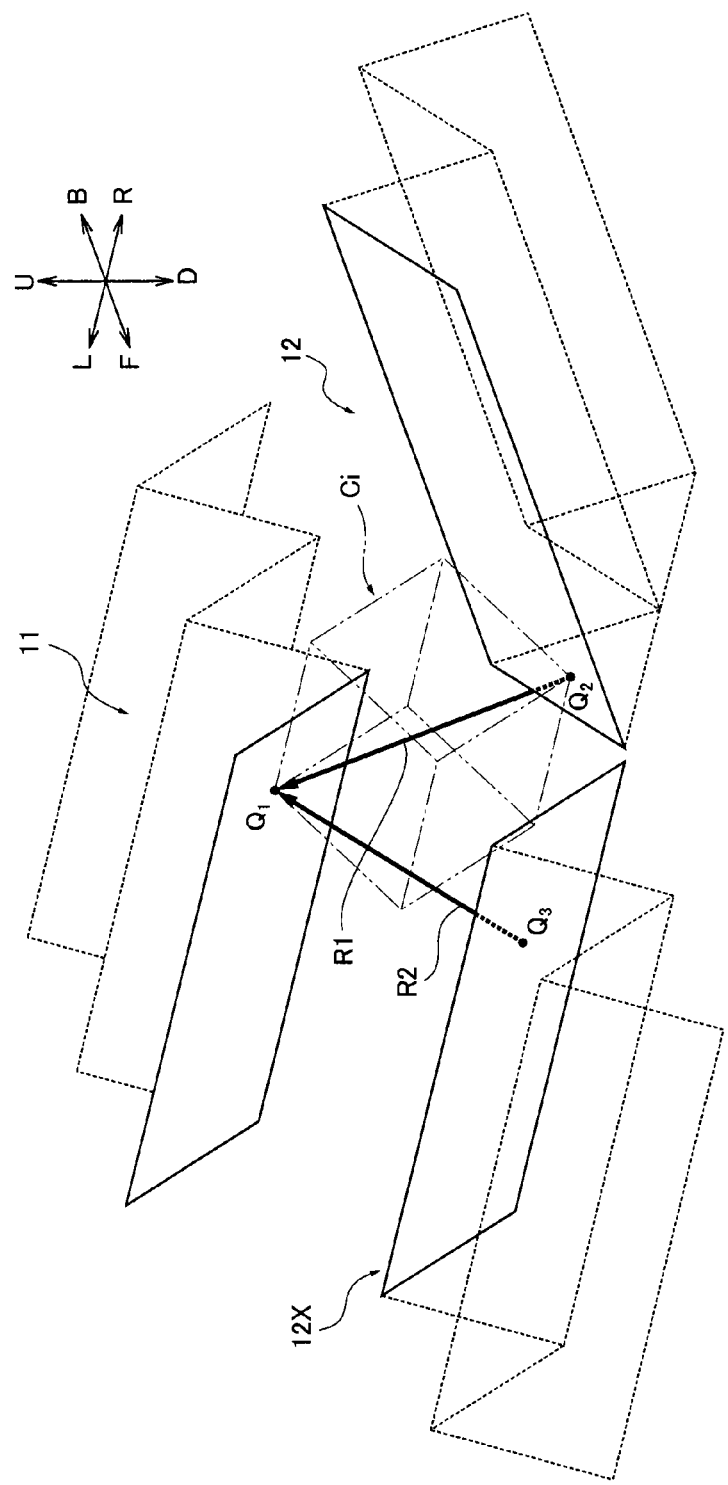
FIG. 7 is an explanatory view illustrating a situation where reflected light from the wavelength selective member and reflected light from a virtual wavelength selective member enter the transparent member.
Figure 8:
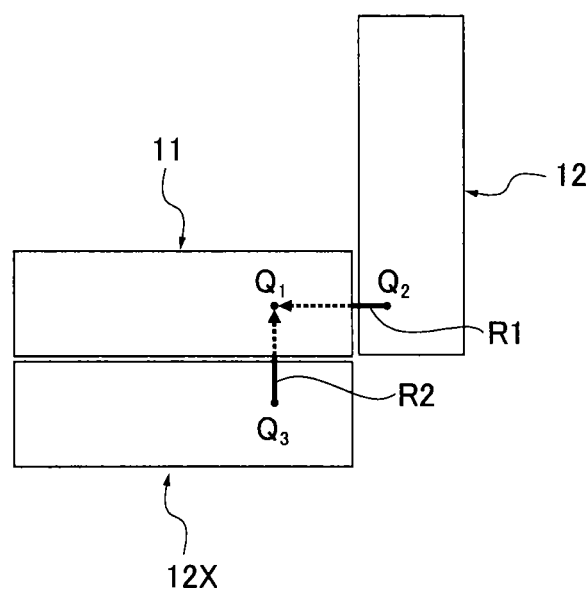
FIG. 8 is an explanatory view illustrating the situation of FIG. 7 from upside of an up-and-down direction.
Figure 9:
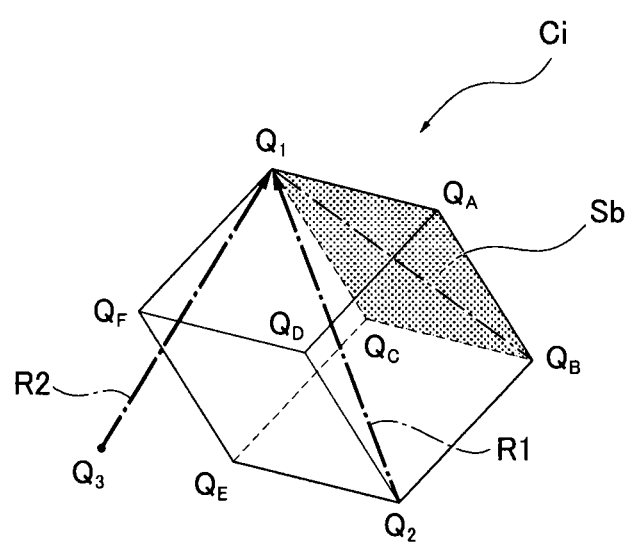
FIG. 9 is an explanatory view illustrating a virtual cube having the diagonal line of which corresponds to the reflected light from the wavelength selective member.

Generation of the multiple-reflections will be explained in detail with reference to FIGS. 7 to 9. FIGS. 7 and 8 illustrates a case where reflected light R1 emitted from a point Q2 on the wavelength selective member 12 and reflected light R2 emitted from a point Q3 on a virtual wavelength selective member 12X advance toward a point Q1 on the transparent member 11. Here, the virtual wavelength selective member 12X has substantially the same configuration as the wavelength selective member 12. The pseudo traveling direction Dt of the virtual wavelength selective member 12X is set to be the front-and-back direction, i.e., the pseudo traveling direction Dt of the wavelength selective member 12 and that of the virtual wavelength selective member 12X are orthogonal to each other.

The reflected light R1 emitted from (to be specific, reflected by) the point $Q_2$ advances along a plane perpendicular to the upper surface of the wavelength selective member 12 (see FIG. 8). The elevation angle of the reflected light R1 with respect to the horizontal plane is 54.74 degree. The reflected light R2 emitted from (to be specific, reflected on) the point $Q_3$ advances along a plane perpendicular to the upper surface of the virtual wavelength selective member 12X (see FIG. 8). The elevation angle of the reflected light R2 with respect to the horizontal plane is also 54.74 degree. That is to say, the angle of the reflected light R1 with respect to the horizontal plane and the angle of the reflected light R2 with respect to the horizontal plane are identical to each other. Note that the degree of 54.74 represents an angle formed by the reflected light R1, which corresponds to a diagonal line of a virtual cube Ci (explained later), with respect to a line perpendicular to a standard plane Sb of the virtual cube Ci. The reflected lights R1 and R2 perpendicularly cross at the point $Q_1$ on the transparent member 11 when viewing from the upside (see FIG. 8).

Here, the virtual cube Ci is defined as illustrated in FIG. 7. Specifically, the point Q1 is defined as one of vertexes of the virtual cube Ci, and the standard plane Sb of the virtual cube Ci is defined along the bottom surface of the transparent member 11 into which the reflected lights R1, R2 enter. Further, the reflected light R1 corresponds to the diagonal line of the virtual cube Ci. As illustrated in FIG. 9, the vertexes on the standard plane Sb other than the vertex (point) $Q_1$ are defined as $Q_A$, $Q_B$, and $Q_C$. The vertexes on a plane opposed to the standard plane Sb other than the point (vertex) $Q_1$ are defined as $Q_D$, $Q_E$, and $Q_F$. The reflected light R2 advances along the plane defined by the vertexes $Q_1$, $Q_C$, $Q_E$, and $Q_F$. Further, since the standard plane Sb is defined along the bottom surface of the transparent member 11, the angle of the standard plane Sb with respect to the horizontal plane is 45 degrees and the standard plane Sb is aligned to be parallel to the upper surface of the virtual wavelength selective member 12X. Hence, the angle of the reflected light R2 ($\angle Q_3Q_1Q_C$) with respect to the standard plane Sb becomes 80.26 degrees (i.e., 180−54.74−45=80.26 degree), and the angle of the reflected light R2 with respect to the line $Q_1Q_F$, which passes through the point $Q_1$ and is perpendicular to the standard plane Sb, becomes 9.74 degree (i.e., 54−74−45=9.74 degree).

By defining a dimension of the length of one side of the virtual cube Ci as 1, the length of the line $Q_1Q_B$ becomes a square root of two (i.e., $2^{0.5}$). The line $Q_1Q_B$ perpendicularly crosses with the line $Q_2Q_B$. Since the reflected light R1 corresponds to the diagonal line $Q_1Q_2$ of the virtual cube Ci, the angle of the reflected light R1 ($\angle Q_2Q_1Q_B$) with respect to the standard plane Sb is 35.26 degree (i.e., $\text{Tan}^{-1}(1/2^{0.5})$ =35.26). In other words, the angle of the reflected light R1 with respect to the line $Q_2Q_B$ perpendicular to the standard plane Sb is 54.74 degree (90−35.26).

Accordingly, even though the angles of the reflected lights R1 and R2 with respect to the horizontal plane are identical to each other, the conditions of the total reflection by the transparent member 11 are likely to be satisfied by the reflected light R1 (i.e., the reflected light reflected on the wavelength selective member 12) rather than by the reflected light R2 (i.e., the reflected light reflected on the virtual wavelength selective member 12X).

In the transparent solar heat absorbing apparatus 10, the reflective sunlight Rr is reflected by the wavelength selective member 12 to the transparent member 11. The reflective sunlight Rr is then totally reflected by the transparent member 11 and returned toward the wavelength selective member 12. The returned reflective sunlight Rr is further reflected on the wavelength selective member 12 to the transparent member 11 again. That is to say, the reflective sunlight Rr is repeatedly reflected between the transparent member 11 and the wavelength selective member 12 (i.e., the multiple reflections occur inside the apparatus 10). In order to secure the multiple reflections (in other words, in order to totally reflect the reflective sunlight Rr), the angles (inclinations) of the transparent member 11 are defined in accordance with the refractive indexes of the transparent member 11 and the heating medium 15. In the example of the apparatus 10 illustrated in FIG. 1, the projected folds and recessed folds of the transparent member 11 are aligned in parallel with an equal interval along the left-and-right direction. Further, the apex angles of the folds forming the triangular waveform are 90 degree. That is to say, the transparent member 11 has inclined faces normally rotated around the X-axis by 45 degree and inclined faces reversely rotated around the X-axis by 45 degree alternatively along the Y-axis direction.

As a result, the transparent solar heat absorbing apparatus 10 can increase the distance (optical path length) of the reflective sunlight Rr passing through the heating medium 15 in the heating tank 14 by several to several tens of times longer than the depth of the heating tank 14. As explained above, the heating medium 15 of this embodiment absorbs the light in the reflection range (to be specific, the infrared light, i.e., the light of the wavelength substantially equal to or greater than 1000 nm). Further, the reflective sunlight Rr is the light in the reflection range. Therefore, the heating medium 15 can absorb the thermal energy from the reflective sunlight Rr according to the distance of the reflective sunlight Rr passing through the heating medium 15. Consequently, the apparatus 10 can efficiently absorb the thermal energy from the sunlight with the heating medium 15.

Here, variations in the incidence angle of the sunlight caused by the diurnal motion of the sun are greater than those caused by changes of the seasons. That is to say, the variations in the incidence angle in the east-and-west direction are greater than those in the north-and-south direction. As is known, the sunlight diurnally rotates around the substantially south-and-north direction. The transparent solar heat absorbing apparatus 10, therefore, disposes the transparent member 11 such that the inclined faces of the projected folds and recessed folds of the transparent member 11 face to the south-and-north direction. That is to say, the pseudo traveling direction Dt of the transparent member 11 (the first direction D1) faces to the south-and-north direction. The cross section of the transparent member 11, therefore, faces to the east-and-west direction. As a result, the apparatus 10 can efficiently absorb the thermal energy from the sunlight with the heating medium 15. Additionally, since the pseudo traveling direction Dt of the transparent member 11 (i.e., the first direction D0) faces to the south-and-north direction, the apparatus 10 can generate the multiple reflections without using a complicated device such as a device for tracking the sunlight. To be specific, by arranging the first direction D1 to be oriented to the south-and-north direction, the apparatus 10 can generate the multiple reflections regardless of the variations of the incidence angles of the sunlight.

As mentioned above, the transparent solar heat absorbing apparatus 10 can efficiently increase the amount of thermal energy to be absorbed by the heating medium 15 even if the amount of the heating medium 15 is relatively small, i.e., the apparatus 10 can increase the absorption rate of the thermal energy. With this, the apparatus 10 can efficiently absorb the thermal energy from the sunlight while reducing the weight of the apparatus 10.

Further, the wavelength selective member 12 of the apparatus 10 allows the sunlight in the transmission range to pass through the wavelength selective member 12. Accordingly, the apparatus 10 can partially allow the sunlight to pass through the wavelength selective member 12. To be specific, the apparatus 10 allows the sunlight in the wavelength range including the visible wavelength range to pass through the wavelength selective member 12. With this, it becomes possible to install the apparatus 10 on a transparent roof of a balcony used for daylighting and rain cover, or on a balcony with a glass handrail, or the like. As a result, the installation places of the apparatus 10 become more flexible.

Further, by determining the transmission range to be the wavelength range in which the photoelectric converter (solar cell) can convert the sunlight into electrical energy, it becomes possible to install the apparatus 10 on top of the photoelectric converter. As a result, the apparatus 10 can widen the wavelength range used to obtain energy from the sunlight without increasing the installation space.

As explained above, at least one of the transparent member 11 and wavelength selective member 12 of the transparent solar heat absorbing apparatus 10 has the waveform structure on at least one of the upper surface and bottom surface thereof. Accordingly, the apparatus 10 can easily achieve the total reflection of the reflective sunlight Rr on the transparent member 11. As a result, the apparatus 10 can generate the multiple reflections of the reflective sunlight Rr between the transparent member 11 and wavelength selective member 12 (i.e., in the heating tank 14) with a simple structure.

The apparatus 10 can efficiently absorb the thermal energy with the heating medium 15 in the heating tank 14 by generating the multiple reflections of the reflective sunlight Rr between the transparent member 11 and wavelength selective member 12. That is to say, unlike a solar waterheater that has a member selectively absorbing the infrared light (e.g., an infrared absorbing filter), the apparatus 10 can prevent no-water heating or dry-heating without a dedicated design. To be specific, for the solar water-heater, the member selectively absorbing the infrared light absorbs the infrared light even without a heating medium. Therefore, the solar water-heater may reach high temperatures even when the heating medium is not flowing inside thereof. The required heat resistance for the solar water-heater, such as a flat-plate heat collector, is about 200 degree C. as indicated by the Solar System Promotion Association in Japan. However, the apparatus 10 absorbs the thermal energy by using the heating medium 15 in the heating tank. Therefore, the apparatus 10 seldom absorbs the thermal energy (i.e., seldom generates heat) when the heating tank 14 is not filled with the heating medium 15. As a result, the apparatus 10 does not need to be specifically designed for preventing the no-water heating.

The apparatus 10 adjusts the angle of the reflective sunlight Rr when viewing from the left-and-right direction by using the wavelength selective member 12 and further adjusts the angle of the reflective sunlight Rr as viewing from the front-and-back direction by rotating the transparent member 11 around the front-and-back direction. Accordingly, the apparatus 10 can increase the incidence angle of the sunlight Rr against the transparent member 11 to be greater than the pseudo critical angle while suppressing the rotation amounts of the transparent member 11 and wavelength selective member 12.

The apparatus 10 can increase the distance (optical path length) of the sunlight Rr passing through the heating tank 14 (to be specific, the heating medium 15) by several to several tens of times longer than the depth of the heating tank 14. By using water as the heating medium 15, the apparatus 10 can efficiently absorb the thermal energy from the sunlight with the water (heating medium 15) and efficiently obtain hot water. Accordingly, the apparatus 10 configures a solar water-heating device having light transmissivity.

The transparent member 11 of the apparatus 10 has the waveform structures on both the upper surface 11a and bottom surface 11b. Here, the transparent member 11 can be formed by molding a thin member such as a film. Therefore, the apparatus 10 can reduce the cost of the material for the transparent member 11, and the transparent member 11 can be easily produced.

In the apparatus 10, the first direction D1 (the pseudo traveling direction Dt of the transparent member 11) is oriented to the south-and-north direction. Accordingly, the apparatus 10 can efficiently absorb the energy from the sunlight although the incident directions and angles of the sunlight vary due to the diurnal motion, seasons, and/or latitudes of the installation places. That is to say, the apparatus 10 can generate the multiple-reflections of the sunlight R between the transparent member 11 and the wavelength selective member 12 regardless of the incident directions and the incidence angles of the sunlight R. As a result, the apparatus 10 can efficiently absorb the thermal energy by using the heating medium 15 of the heating tank 14 without using a complicated device such as a device for tracking the sunlight. That is to say, by installing the apparatus 10 to be oriented to the left-and-right direction of the apparatus 10 to the east-and-west direction, the apparatus 10 can efficiently absorb the thermal energy from the sunlight regardless of the diurnal motion, seasons, and/or latitudes of the installation places.

The reflection range of the wavelength selective member 12 is defined to be substantially the same as the infrared wavelength range, and the transmission range is defined to be shorter than the reflection range. Accordingly, the apparatus 10 can be disposed on top of the photoelectric converter (solar cell) that converts the sunlight of the wavelength from about 300 nm to 1000 nm into electrical energy. As illustrated in FIG. 7, amorphous silicon (a-Si) solar cells absorb the sunlight of the wavelength up to about 700 nm, copper zinc tin sulfide (CZTS) solar cells absorb the sunlight of the wavelength up to about 800 nm, gallium arsenide (GaAs) solar cells absorb the sunlight of the wavelength up to about 850 nm, cadmium tellurium (CdTe) solar cells absorb the sunlight of the wavelength up to about 850 nm, and copper indium gallium selenide (CIGS) solar cells absorb the sunlight of the wavelength up to about 1000 nm. Note that single crystal silicon (single crystal-Si) solar cells can absorb the sunlight of the wavelength up to about 1100 nm, but are expensive and difficult to increase the size. As a result, the apparatus 10 can be disposed on top of most of the solar cells, i.e., it does not need to dispose the apparatus 10 and the photoelectric converter (solar cell) next to each other. Hence, the apparatus 10 can widen the wavelength range used to obtain energy from the sunlight without increasing the installation spaces and the cost.

The wavelength selective member 12 of the apparatus 10 is formed by covering PET film with a coating film of silver iodide tabular grains. With this, the cost for achieving the wavelength selective reflection is reduced. To be specific, in order to use a dielectric multilayer film to achieve the wavelength selective reflection, the dielectric multilayer film needs to be formed by laminating several tens of films with a vacuum film formation method. That is to say, increasing the size of the apparatus 10 with the dielectric multilayer film requires a large laminating device, thereby increasing the cost.

The maximum transmission wavelength of the wavelength selective member 12 is set to be 1015 nm, i.e., any light having the wavelength range of shorter than 1015 nm is allowed to pass through the wavelength selective member 12. Accordingly, the apparatus 10 can be disposed on top of the photoelectric converter (solar cell) that converts the sunlight in the wavelength range from about 300 nm to 1000 nm. As a result, the apparatus 10 can widen the wavelength range used to obtain energy from the sunlight without increasing the installation spaces and the cost.

As explained above, the transparent solar heat absorbing apparatus 10 of the embodiments according to the present invention can efficiently absorb thermal energy from the sunlight by allowing a part of the sunlight to pass through the apparatus while reducing the weight of the apparatus 10.

Although the transparent member 11 and wavelength selective member 12 of the apparatus 10 are made from the PET film, they may be made from a polycarbonate (PC) film. Since the PC films have higher durability than the PET films, the apparatus 10 using the PC films can secure the above effects even longer than the apparatus 10 using the PET films. Note that the refractive index of the PC film is substantially the same as that of the PET film, i.e., 1.6. Hence, by simply replacing the PET films with the PC films, the apparatus 10 can achieve the abovementioned effects.

Although the wavelength selective member of the apparatus 10 is formed by covering the PET film (may be the PC film) with the coating film of the silver iodide tabular grains, the wavelength selective member 12 may be formed by covering the PET film (or PC film) with a dielectric multilayer film. The dielectric multilayer film can integrally control the reflection property and transmission property by adjusting the refractive index and/or the thickness of the film. For example, by applying a product called FF01-790/SP-25 manufactured by Opto-Line, Inc. to the wavelength selective member 12, the wavelength selective member 12 can absorb the light having the wavelength range of greater than 760 nm and allows the light having the wavelength range of shorter than 760 nm to pass through.

Figure 11A:
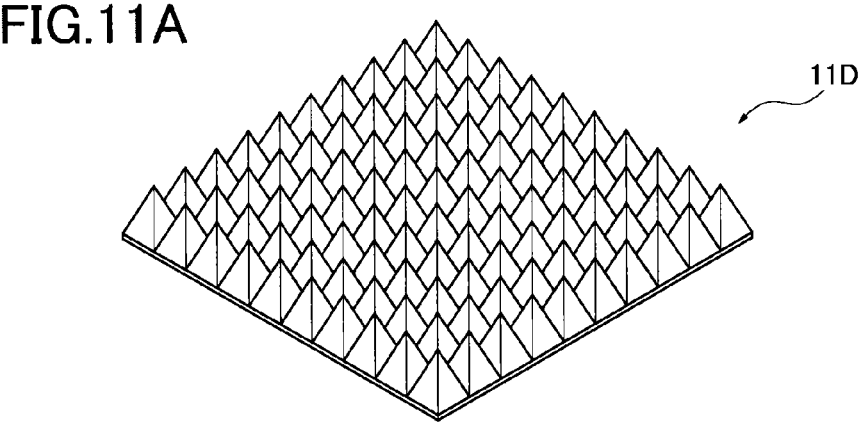
FIG. 11A is an explanatory view illustrating a transparent member different from the transparent members of FIGS. 2A-2C.
Figure 11B:
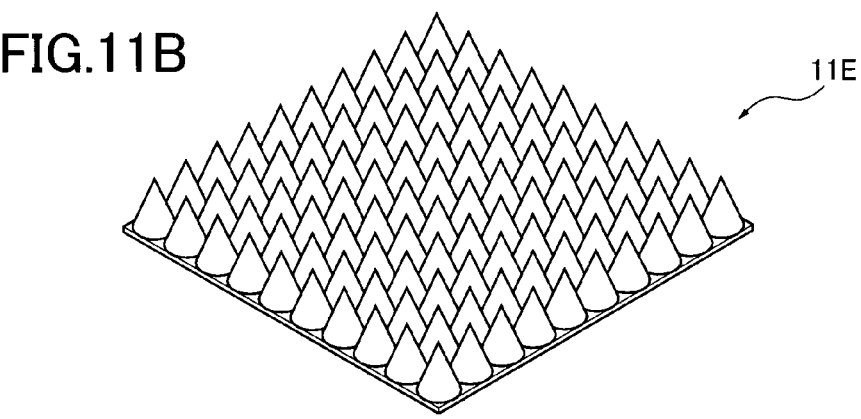
FIG. 11B is an explanatory view illustrating another transparent member different from the transparent member of FIG. 11A.
Figure 11C:
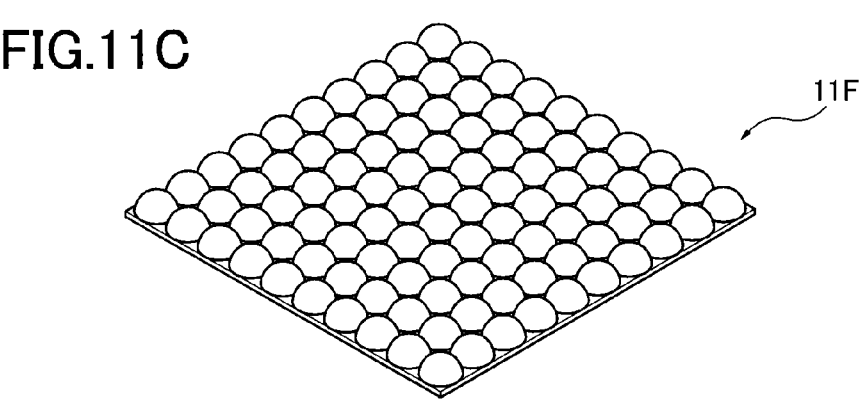
FIG. 11C is an explanatory view illustrating another transparent member different from the transparent members of FIG. 11A and FIG. 11B.

In the above explanation, the waveform structures of the transparent member 11 and wavelength selective member 12 are illustrated in FIGS. 2A to 2C. However, they are only examples, and the structures, therefore, should not be limited thereto. For example, FIGS. 11A to 11C illustrate other examples. In FIG. 11A, a plurality of quadrangular pyramids are aligned in a matrix-shape on the PET film to form the transparent member 11D (or the wavelength selective member 12D). In FIG. 11B, a plurality of cones are aligned in a matrix-shape on the PET film to form the transparent member 11E (or the wavelength selective member 12E). In FIG. 11C, a plurality of hemispheres are aligned in a matrix-shape on the PET film to form the transparent member 11F (or the wavelength selective member 12F).

Embodiment 1

Figure 12:
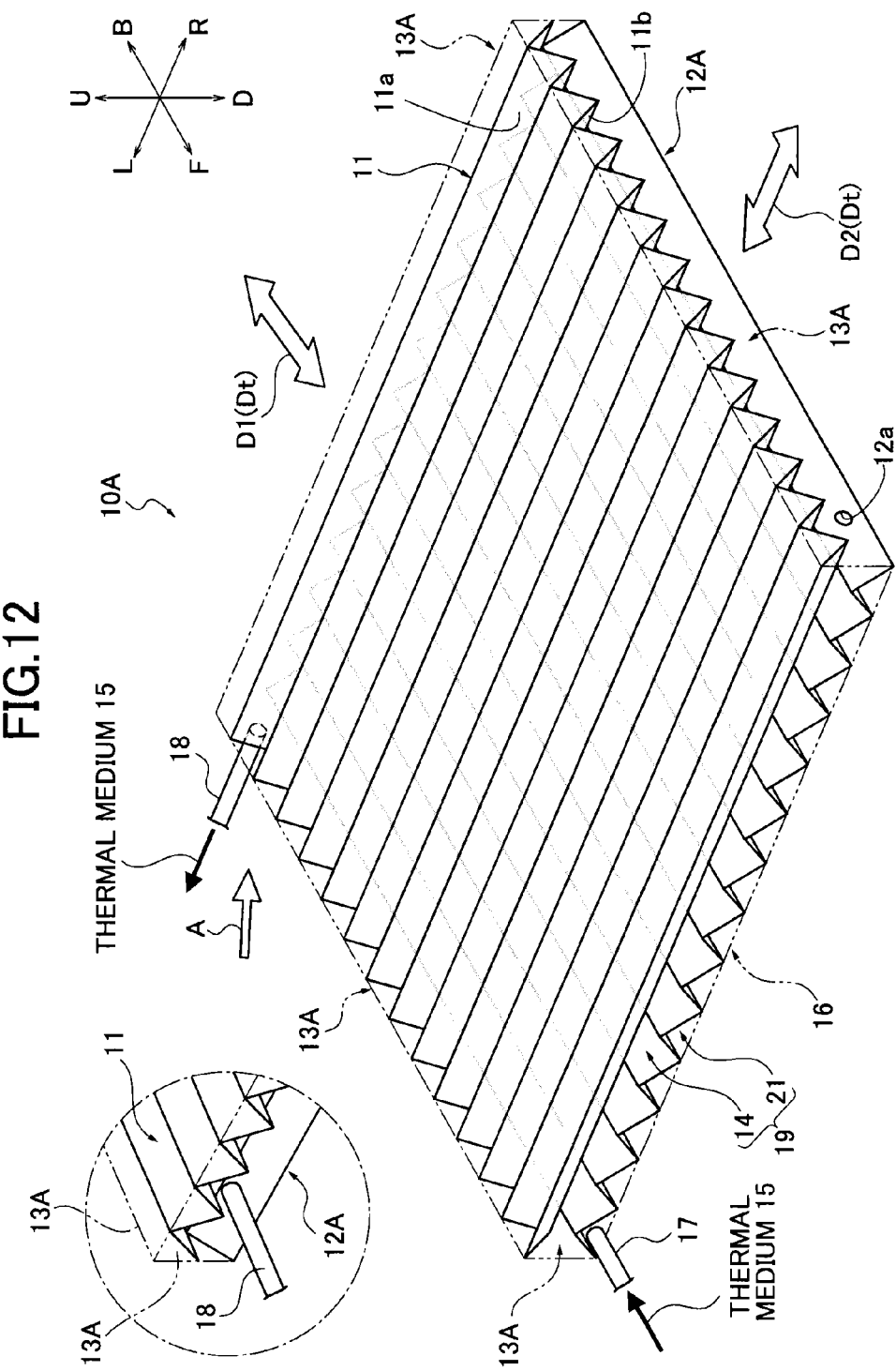
FIG. 12 is a schematic view illustrating an overall configuration of the solar heat absorbing apparatus of a first embodiment.
Figure 13:
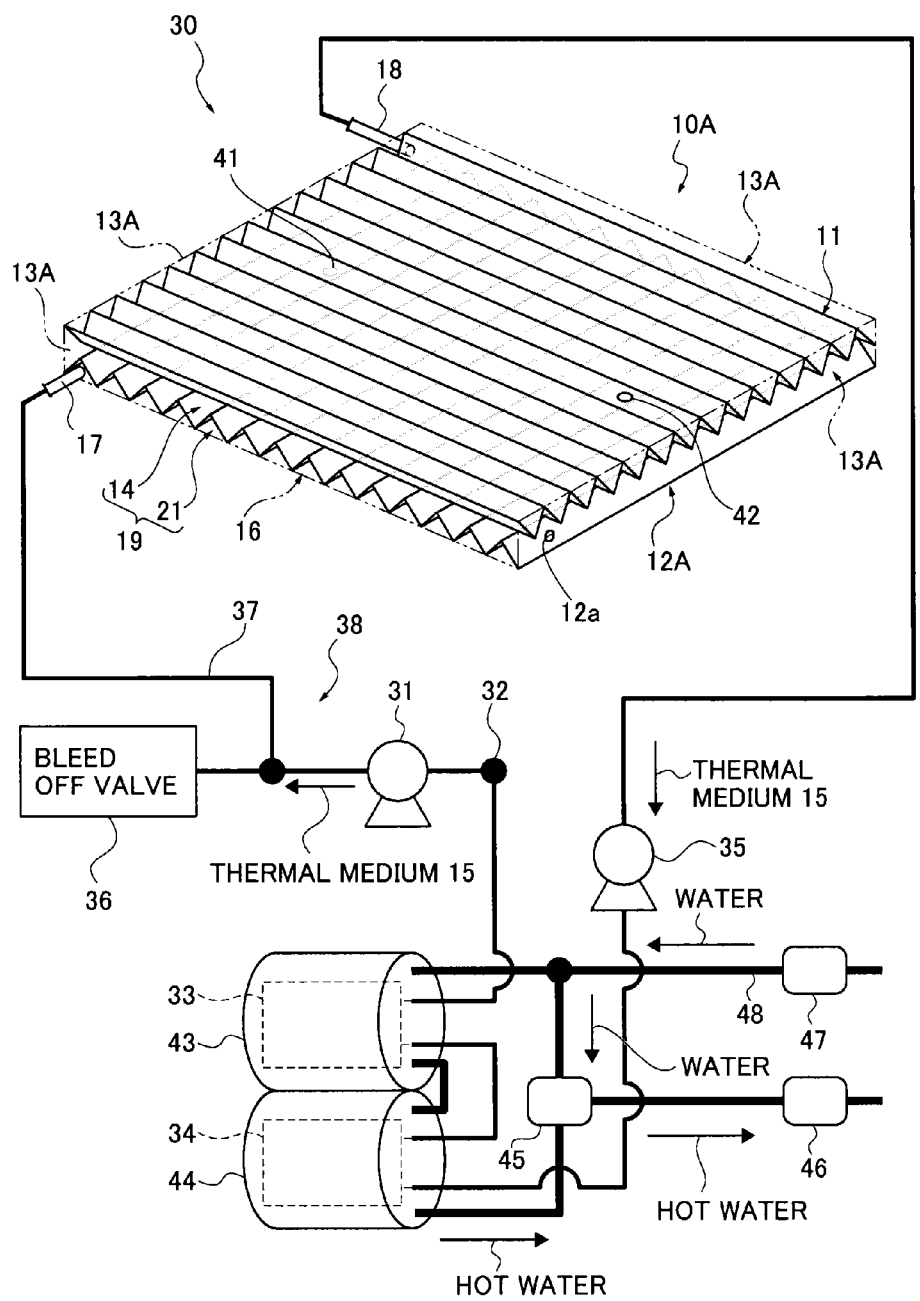
FIG. 13 is a schematic view illustrating an overall configuration of a solar water heating system of the first embodiment.

Here, a transparent solar heat absorbing apparatus 10A and a solar water heating system 30 equipped with the apparatus 10A according to a first embodiment of the present invention will be explained. Note that the same components of the apparatus 10A as those of the apparatus 10 are indicated by the same reference signs, and the detailed explanation thereof will be omitted. FIG. 12 is an explanatory view similar to FIG. 1 but for explaining the configuration of the apparatus 10A. FIG. 13 is an explanatory view for explaining the configurations of the solar water heating system 30.

As illustrated in FIG. 12, the apparatus 10A includes a transparent member 11, a wavelength selective member 12A, and side wall plates 13A. Additionally, the apparatus 10A further includes a bottom plate 16, an inlet 17, and an outlet 18. A transmission range (a predetermined wavelength range) of the wavelength selective member 12A is set to be shorter than 760 nm, and a reflection range (a prescribed wavelength range) of the wavelength selective member 12A is set to be greater than 760 nm.

When the apparatus 10A uses water as the heating medium 15, dye or pigment may be mixed with the heating medium 15 to partially absorb the light having the wavelength range of 760 nm to 1000 nm since the absorption rate of the water for the light having the wavelength range of 760 nm to 1000 nm is extremely low. In that case, carbon-black dispersion liquid, such as Indian inks, may be mixed with the heating medium (water) 15 such that the absorption rate of the heating medium 15 for the light having the wavelength range of 760 nm to 1000 nm becomes 5% when the optical path length of the heating tank (i.e., the thickness of the heating tank 14) is 2 mm. Accordingly, the apparatus 10A can absorb the thermal energy from the light having the wavelength range of 760 nm to 1000 nm. Although the heating medium 15 mixed with the carbon-black dispersion liquid also absorbs the thermal energy from the visible light at absorption rate of 5%, such a low absorption rate should not affect the daylighting even if the apparatus 10A is installed on the transparent roof of a balcony and the like. Although the heating medium 15 mixed with the carbon-black dispersion liquid has the absorption rate of only 5% with the optical length of 2 mm, the optical path is increased by generating the multiple reflections. As a result, the heating medium 15 can efficiently absorb the light having the wavelength range of 760 nm to 1000 nm. For example, when the optical path length is increased to 100 nm due to the multiple reflections, the heating medium 15 can absorb more than 90% of the light (thermal energy).

The bottom plate 16 is formed by a member that allows at least the visible light (the light in the visible wavelength range) to pass through. The bottom plate 16 is larger than the wavelength selective member 12A in the plane view and aligned along the plane orthogonal to the up-and-down direction. The side wall plates 13A are disposed around the bottom plate 16.

The side wall plates 13A surround the four sides of the wavelength selective member 12A and the transparent member 11 on the bottom plate 16. The side wall plates 13A form a water storage space 19 to be filled with a heating medium 15 together with the bottom plate 16 and the transparent member 11. The water storage space 19 is divided to an upper space and a lower space by the wavelength selective member 12A. The upper space of the water storage space 19 is formed between the transparent member 11 and the wavelength selective member 12A and used as a heating tank 14. The lower space of the water storage space 19 is formed between the wavelength selective member 12A and the bottom plate 16 and used as a heating-medium reservoir 21 (explained later). The wavelength selective member 12A has a through hole 12a on the rightmost inclined surface of the wavelength selective member 12A. The heating tank 14 and the heating-medium reservoir 21 are connected via the through hole 12a.

The inlet 17 is formed at the left end of the side wall plate 13A on the front side. The outlet 18 is formed at the back end of the side wall plate 13A on the left side. The inlet 17 is connected with the heating-medium reservoir 21, and the outlet 18 is connected with the heating tank 14. The heating medium 15 is filled into the heating-medium reservoir 21 through the inlet 17. The heating medium 15 then flows into the heating tank 14 through the through hole 12a and fills up the heating tank 14. Further, the heating medium 15 is outputted from the heating tank 14 (i.e., the water storage space 19) through the outlet 18. Accordingly, the apparatus 10A forms a path (fluid path) from the heating-medium reservoir 21 to the heating tank 14.

As a result, the apparatus 10A can efficiently absorb the thermal energy from the sunlight with the heating medium 15 in the heating tank 14. Further, the apparatus 10A can output the heating medium 15 heated by the absorbed thermal energy in the heating tank 14 to the outside through the outlet 18.

Next, the solar water heating system 30 using the transparent solar heat absorbing apparatus 10A will be explained. As illustrated in FIG. 13, the apparatus 10A is connected with a first pump 31, a first temperature sensor 32, a first heat exchanger 33, a second heat exchanger 34, a second pump 35, and a bleed off valve 36 via a heating-medium circulation pipe 37. Note that the first pump 31, first temperature sensor 32, first heat exchanger 33, second heat exchanger 34, second pump 35, bleed off valve 36, and heating-medium circulation pipe 37 form a heating-medium circuit 38 together with the water storage space 19 (heating tank 14 and heating-medium reservoir 21).

In the system 30, the inlet 17 is connected with the first pump 31 via the heating-medium circulation pipe 37. The first pump 31 is connected with the first heat exchanger 33 via the heating-medium circulation pipe 37. The first pump 31 circulates the heating medium 15 in the heating-medium circuit 38 together with the second pump 35. To be specific, the first pump 31 sends the heating medium 15 from the first heat exchanger 33 to the heating-medium reservoir 21 in the water storage space 19 through the inlet 17. The first temperature sensor 32 detects temperature of the heating medium 15 between the first pump 31 and the first heat exchanger 33.

The first heat exchanger 33 is connected with the second heat exchanger 34 via the heating-medium circulation pipe 37. The first heat exchanger 33 exchanges the thermal energy between the heating medium 15 circulating therein and water stored in a first water tank 43. The second heat exchanger 34 exchanges the thermal energy between the heating medium 15 circulating therein and water stored in a second water tank 44. As explained, the heating medium 15 is heated in the heating tank 14 in the water storage space 19 of the apparatus 10A. Accordingly, the first and second heat exchangers 33, 34 respectively increase the temperature of the water stored in the first and second water tanks 43, 44 by using the heated heating medium 15.

The second heat exchanger 34 is connected with the second pump 35 via the heating-medium circulation pipe 37. The second pump 35 sends the heating medium 15 from the heating tank 14 to the second heat exchanger 34 through the outlet 18. The bleed off valve 36 is provided on the heating-medium circulation pipe 37 between the first pump 31 and the inlet 17 for bleeding off gas (air) from the heating-medium circulation pipe 37 (i.e., the heating-medium circuit 38).

Further, the apparatus 10A (the system 30) includes a second temperature sensor 41 and an illuminance sensor 42. The second temperature sensor 41 detects temperature of the heating medium 15 inside the heating tank of the water storage space 19, i.e., the temperature of the heated heating medium 15. The illuminance sensor 42 detects a light intensity at the transparent member 11 of the apparatus 10A.

Additionally, the system 30 is connected with the first water tank 43, the second water tank 44, a water-mixing valve with a thermostat 45, a water heater 46, and a water supplier 47 via a water circulation pipe 48. The water supplier 47 is connected with the first water tank 43 via the water circulation pipe 48 to supply water. The water supplier 47 of the first embodiment is adapted to supply tap-water. The first water tank 43 reserves the supplied water and accommodates the first heat exchanger 33 inside thereof. The water supplied from the water supplier 47 is heated to obtain hot water by using the first heat exchanger 33 in the first water tank 43. The first water tank 43 is connected with the second water tank 44 via the water circulation pipe 48. The hot water in the first water tank 43 is supplied to the second water tank 44 and reserved in the second water tank 44. Further, the second water tank 44 accommodates the second heat exchanger 34 inside thereof. The first and second water tanks 43, 44 are covered with thermal insulating materials or the like, so as to secure the heat storage property.

The water-mixing valve with the thermostat 45 is interposed between the second water tank 44 and the water heater 46. The water-mixing valve 45 is also interposed between the water supplier 47 and the first water tank 43. The water-mixing valve 45 connects the second water tank 44 and the water heater 46. When the temperature of the water flowing through the water-mixing valve 45 exceeds a predetermined temperature, the water-mixing valve 45 opens and connects the water circulation pipe 48 to mix the hot water from the second water tank 44 with the water from the water supplier 47. Note that the thermostat of the valve 45 determines whether the temperature of water flowing through the water-mixing valve 45 exceeds the predetermined temperature. Here, the predetermined temperature is set by the user, i.e., the user can obtain hot water at the predetermined temperature. The water heater 46 heats the water supplied from the second water tank 44 through the water-mixing valve 45 up to the predetermined temperature and then supplies the hot water to the user via the water circulation pipe 48. Note that in this embodiment, the water heater 46 is a gas water heater.

The solar water heating system 30 of this embodiment sends the heating medium 15 to the water storage space 19 of the transparent solar heat absorbing apparatus 10A by using the first and second pumps 31, 35. The heating medium 15 sent to the water storage space 19 then absorbs the thermal energy from the sunlight in the heating tank 14 thereof. The heating medium 15 retains in the heating tank 14 or continuously and gradually flows in the heating tank 14 so as to sufficiently absorb the thermal energy from the sunlight. Further, the heating medium 15 heated in the heating tank 14 is sent to the second heat exchanger 34 and first heat exchanger 33 by the first and second pumps 31, 35. Accordingly, the first heat exchanger 33 and the second heat exchanger 34 respectively increase the temperature of the water inside the first water tank 43 and the second water tank 44 by using the heated heating medium 15.

The second temperature sensor 41 detects the temperature of the heated heating medium 15 inside the heating tank 14. When the detected temperature of the heating medium 15 exceeds a prescribed temperature, the system 30 operates the second pump 35 to send the heated heating medium 15 to the second heat exchanger 34. Further, the first temperature sensor 32 detects the temperature of the heating medium 15 between the first heat exchanger 33 and the inlet 17, and the illuminance sensor 42 detects the light intensity at the transparent member 11 (i.e., the intensity of the sunlight). The system 30 determines whether to send the heating medium 15 to the apparatus 10A (i.e., to the water storage space 19) based on the detected temperature and light intensity. For example, during the night (i.e., when the light intensity is small), the system 30 determines not to send the heating medium 15 to the apparatus 10A since it is impossible to increase the temperature of the heating medium 15. Further, when the ambient temperature is lower than the temperature of the heating medium 15 detected by the first temperature sensor 32 due to low solar radiation, sending the heating medium 15 to the apparatus 10A results in a loss of the thermal energy because the heating medium 15 is cooled by the apparatus 10A. Therefore, the system 30 also determines not to send the heating medium 15 to the apparatus 10A under such a condition.

The system 30 increases the temperature of the water in the first and second water tanks 43, 44 by using the first and second heat exchangers 33, 34 (to be specific, the heating medium flowing thereto) and supplies the hot water (i.e. the water temperature is increased by the first and second heat exchangers 33, 34). Here, when the temperature of the hot water supplied from the second water tank 44 exceeds the predetermined temperature, the system 30 controls the water-mixing valve with the thermostat 45 to mix the hot water with the water supplied from the water supplier 47 and adjusts the temperature to the predetermined temperature. When the temperature of the hot water supplied from the second water tank 44 does not reach the predetermined temperature, the system 30 heats the hot water with the water heater 46 to achieve the predetermined temperature. As a result, the system 30 of the first embodiment can obtain the hot water by using the emitted sunlight while allowing the sunlight to pass through the apparatus 10 partially.

Here, calculation results of the thermal energy obtained by the solar water heating system 30 and an amount of the heating medium 15 per unit area will be shown below. The amount of the heating medium 15 per unit area (L/m$^2$) is calculated based on the temperature (degree C.) of the tap-water supplied to the first water tank 43, the required temperature (degree C.) of the hot water supplied from the second water tank 44, the wattage of the sunlight per unit area (W/m$^2$), the energy efficiency (%), and the like.

In Tokyo, Japan, the average temperature of the tap-water is 16.5 degree C. When the required temperature of the hot water is about 40 degree C., the tap-water needs to be increased by about 23 to 24 degree C. The following design values are calculated by assuming that the tap-water needs to be increased by 24 degree C.

(1) In each household (excluding a single-person household), the energy of the hot water consumed per day is about 10200 kcal=42.74 MJ.

(2) Here, each household in Japan uses about 400 liter (L) of hot water for each day. Therefore, in order to supply all of the required energy of the hot water by the sunlight, the system 30 needs to increase the 400 (L) of the tap-water by 25.5 degree C. (i.e., 10200/400=25.5). When using 55 gallon drums (i.e., 208 (L) drums) for the first and second water tanks 43, 44, the total capacity of the first and second water tanks 43, 44 become 416 (L). The following calculations were made by using the capacity of 416 (L) for the water tanks. Note that the total capacity represents the total water amount reserved in the first and second water tanks 43, 44 and the capacities of the first and second heat exchangers 33, 34 accommodated inside the tanks 43, 44.

(3) The average quantity of the solar radiation per day (12 hours) in Tokyo is 13.2 (MJ/m$^2$). Since it is difficult to efficiently utilize the sunlight 1.5 hours after the sunrise and 1.5 hours before the sunset, the effective quantity of the solar radiation per day (9 hours) is 12.67 (MJ/m$^2$).

(4) Based on the result of (3), the average of the effective intensity of the solar radiation per day is, $I_E$=12.67 (MJ/m$^2$)/9 (hours)=391 W/m$^2$.

Figure 14:
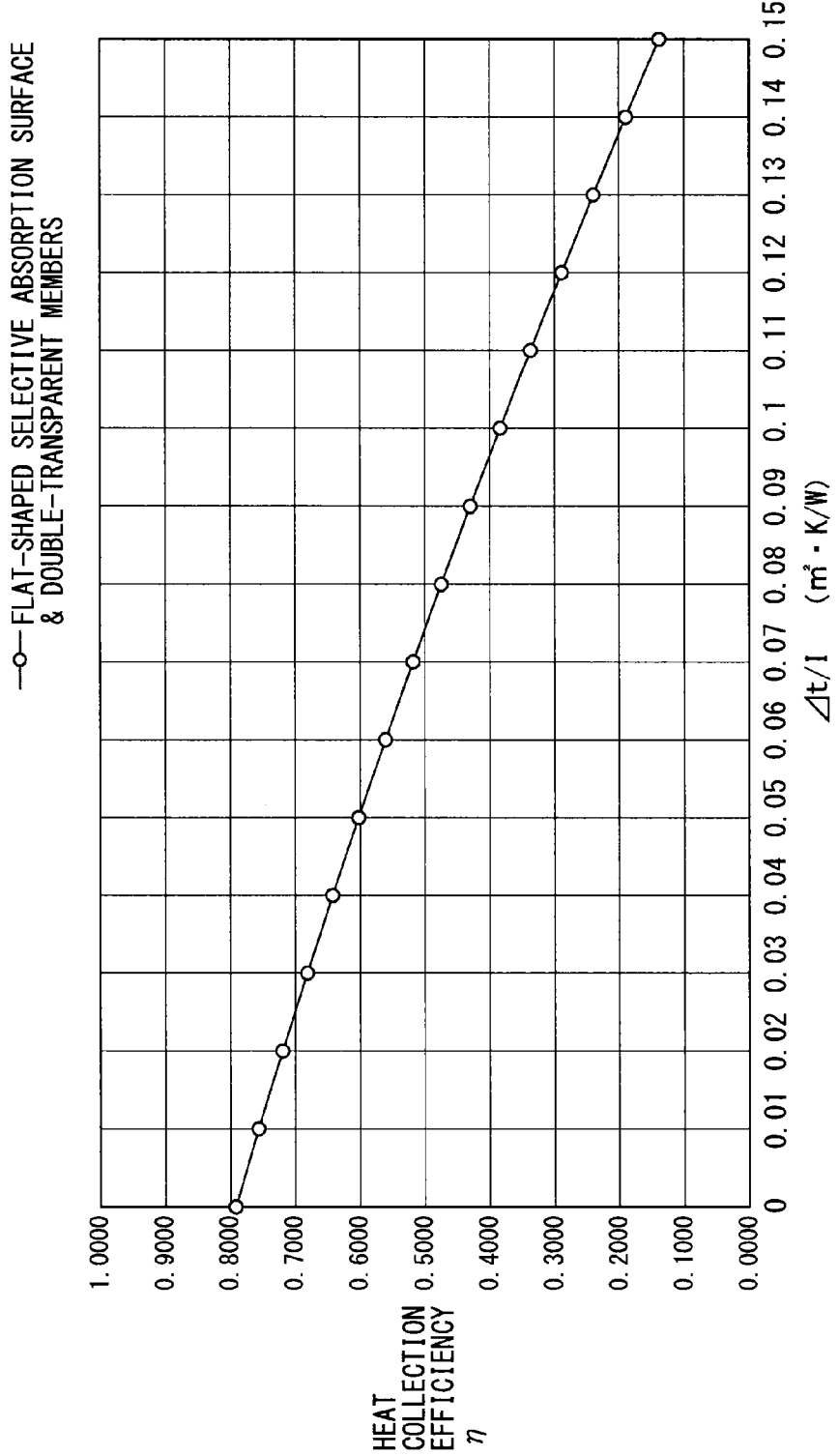
FIG. 14 is a line graph illustrating instantaneous heat collection efficiency when using a flat-shaped selective absorption surface and double-transparent members.

(5) Under the condition of Air Mass 1.5 Global (AM1.5G), the energy ratio of the energy in the infrared light (i.e., the light of the wavelength equal to or greater than 760 nm) to the total energy of the sunlight is 45.3%. Accordingly, in order to increase the temperature of the water by 24 degree C. ($\Delta t$), a value $\Delta t/I$ becomes, $\Delta t/I=\Delta t/(I_E \times 0.453) 24/(391 \times 0.453)=0.135$ m$^2$K/W. As illustrated in the line graph of instantaneous heat-collection efficiencies when using a flat-shaped selective absorption surface and double-transparent members (FIG. 14), the energy ratio (heat collection efficiency is determined to be 22%.

(6) Based on the results (1), (3), and (5), a required area for the heating tank 14 of the transparent solar heat absorbing apparatus 10A becomes 15.334 m$^2$ to supply all the required energy of the hot water by the sunlight.

(7) When the capacities of the first heat exchanger 33 and the second heat exchanger 34 are relatively large, the area of the heating tank 14 increases. To avoid this, the thickness of the heating tank 14 may be increased without changing the area of the heating tank 14. However, if the thickness of the heating tank 14 is increased, the amount of the heating-medium 15 per unit area also increases. That is to say, it becomes difficult to increase the temperature of the heating medium 15 to the target temperature. On the other hand, when the capacities of the first heat exchanger 33 and the second heat exchanger 34 are relatively small, it is difficult to increase the temperature of the 400 (L) of water (under the above calculation, 416 (L) of water) to the target temperature with the quantity of solar radiation per day. Accordingly, a design value $\alpha$ (L/m$^2$) regarding the amount of the heating medium 15 per unit area in the heating tank 14 of the apparatus 10A can be determined based on the above conditions of (4) and (6) and the following equations (a) to (c). Note that in the following equations, the parameter 13 (L) represents the total amount of the capacities of the first and second heat exchangers 33, 34, and the coefficient $\gamma$ represents the percentage of the solar energy to the energy of (1).

$$10200 \times \gamma = (416 - \beta) \times 24 \quad (a)$$

$$\beta = 15.334 \times \alpha \times \gamma \quad (b)$$

$$24 \times 4.19 \times 1000 \times \alpha = 391 \times 0.22 \times 9 \times 3600 \times (\beta/(416-\beta)) \quad (c)$$

Here, the above equations are calculated under the following conditions. For example, the optimum amount of the water (hot water) reserved in the first and second water tanks 43, 44 is ten times as large as the total capacity of the first and second heat exchangers 33, 34 in order to increase the water by 24 degree C. with effective solar radiation in 9 hours. Accordingly, the design values are calculated such that the system 30 increases the temperature of the heating medium 15 by 24 degree C. in 0.9 hours (9 hours/10) and repeats this operation ten times.

Based on the equations (a) to (c), the design value $\alpha$ of the heating medium 15 becomes 1.88401 (L/m$^2$). The coefficient $\gamma$ becomes 0.916551, and the total capacity $\beta$ of the first and second heat exchangers 33, 34 becomes 26.4786 (L). Accordingly, the amount of the water reserved in the first and second water tanks 43, 44 becomes: 416 (L)–$\beta$=389.52 (L). That is to say, the system can cover about 91.7% of the energy of the hot water consumed in each household per day (i.e., 10200 kcal) (i.e., 389.52 (L)×24 degree C./10200 (kcal)=91.7%).

As explained, the design value $\alpha$ for the heating medium 15 of the solar water heating system 30 per unit area is determined to be 1.88401 (L/m$^2$). That is to say, the required thickness of the heating tank 14 of the transparent solar heat absorbing apparatus 10A can be 1.88401 mm. Accordingly, the apparatus 10A of the solar water heating system 100 can be extremely thin, and the weight of the apparatus 10A, therefore, becomes extremely light. Further, the system 30 can cover most of the energy of the hot water consumed in each household per day.

Note that the apparatus 10A of the first embodiment has almost the same configurations as the apparatus 10 of FIG. 1. Therefore, the apparatus 10A has the similar advantageous effects to those of the apparatus 10.

Since the apparatus 10A can efficiently absorb the thermal energy from the sunlight, the system 30 can efficiently generate hot water with the apparatus 10A.

Further, the system 30 can be optimally designed to achieve an efficient heat exchange with the first and second heat exchangers 33, 34 in the first and the second water tanks 43, 44. With this, the system 30 can efficiently generate the hot water.

The system 30 can be optimally designed to suppress an increase of the area of the heating tank 14 while efficiently exchanging heat with the first and second heat exchangers 33, 34 inside the first and second water tanks 43, 44. As a result, the system 30 can efficiently generate the hot water while saving the space.

As explained, the system 30 can install the transparent solar heat absorbing apparatus 10A to a transparent roof of a balcony used for daylighting and rain cover or on a balcony with a glass handrail. As a result, the installation places of the system 30 become more flexibly selectable. That is to say, the system 30 can achieve both daylighting and generating the hot water.

Accordingly, the transparent solar heat absorbing apparatus 10A of the first embodiment of this invention can efficiently absorb the thermal energy from the sunlight by allowing a part of the sunlight to pass through while reducing the weight of the apparatus 10A.

Note that the apparatus 10A of the first embodiment may include a cover to cover the transparent member 11. The cover is made from a material that allows the light in the wavelength range used by the apparatus 10A (i.e., the visible light and infrared light) to pass through and protects the transparent member 11 from being exposed to the outside. With this, the apparatus 10A prevents the transparent member 11 from contacting the outside air such that the apparatus 10A can avoid heat radiation of the heating medium 15 through the transparent member 11. As a result, the apparatus 10A can more efficiently absorb the thermal energy from the sunlight.

Embodiment 2

Figure 15:
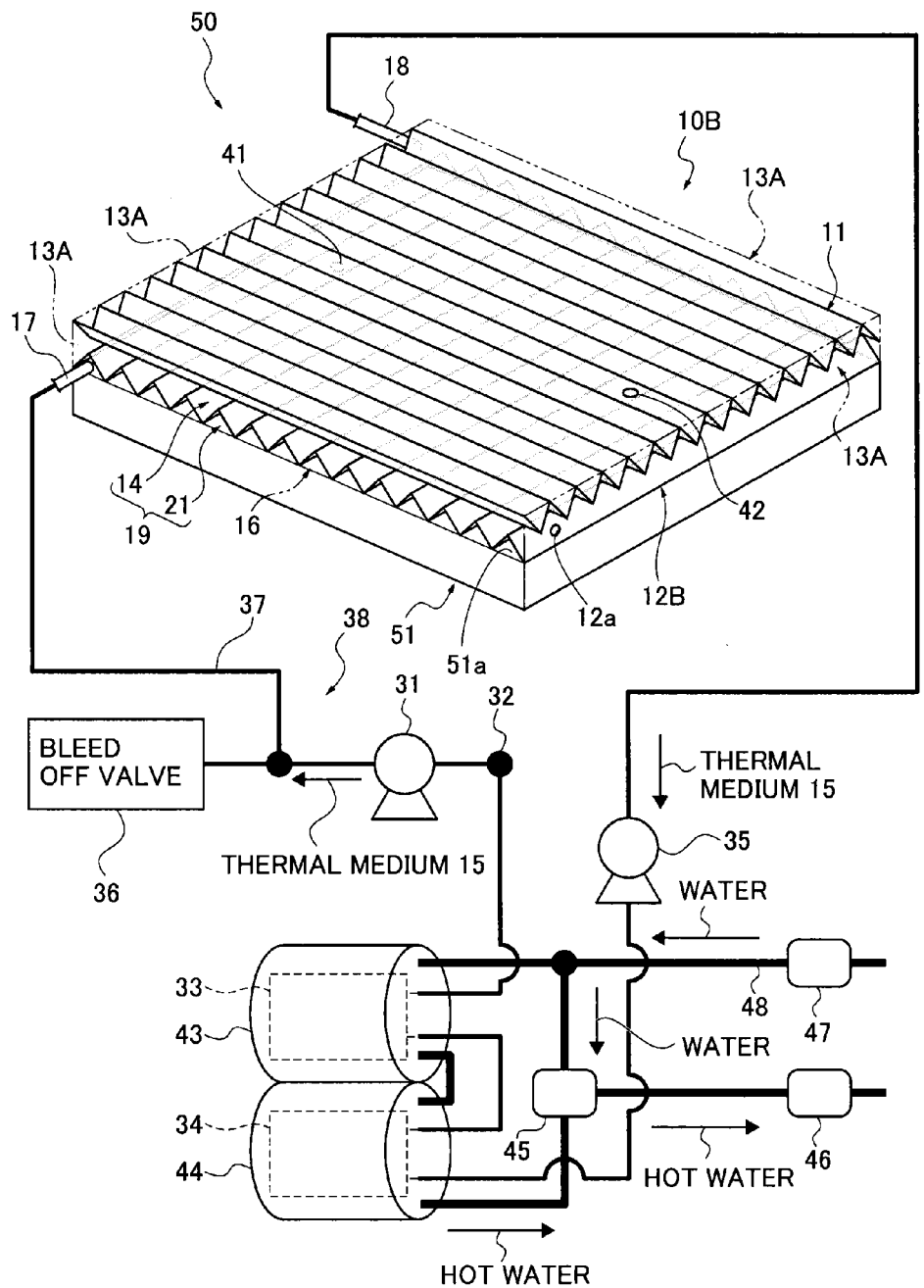
FIG. 15 is a schematic view illustrating an overall configuration of a solar cogeneration system of a second embodiment.
Figure 16:
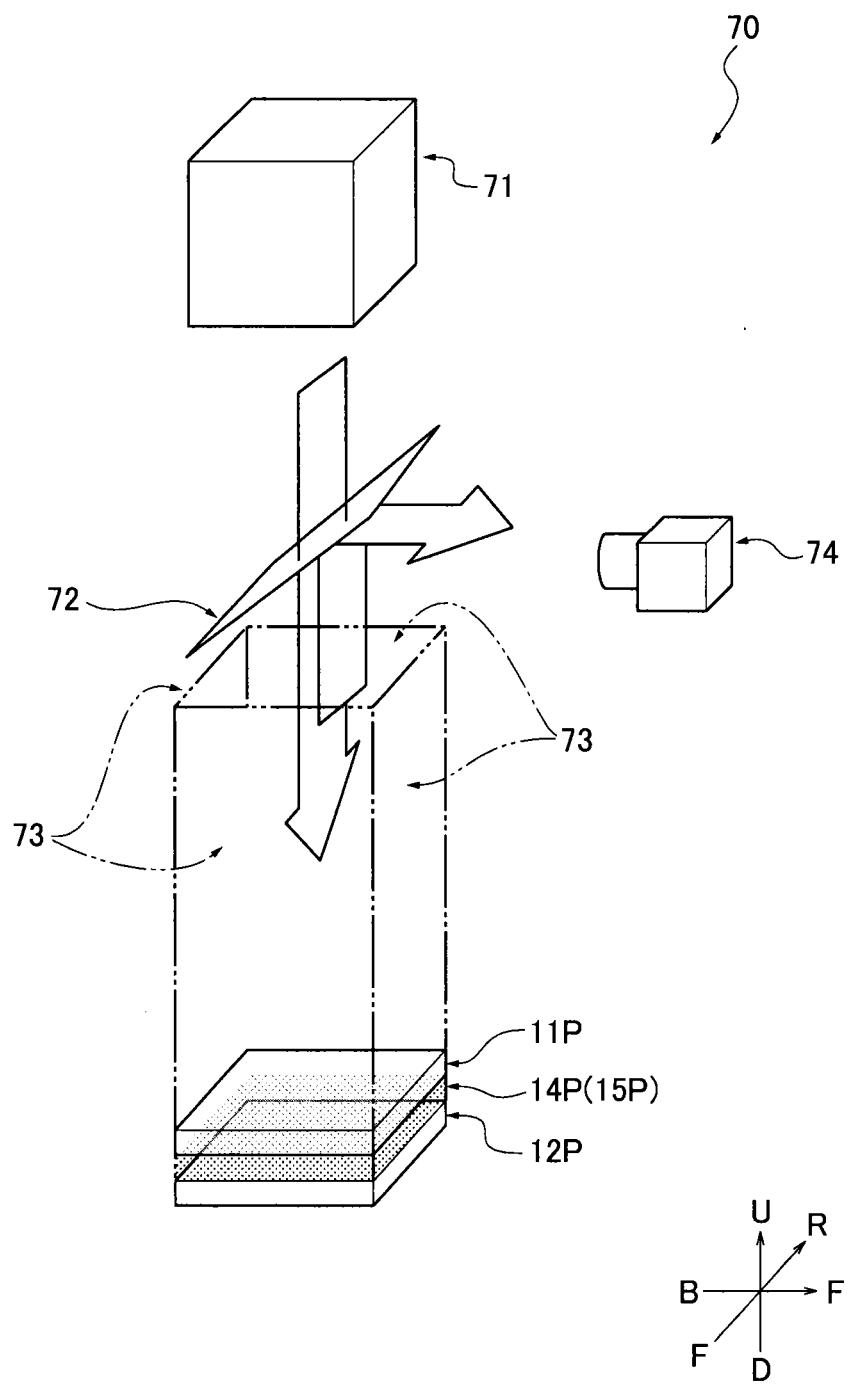
FIG. 16 is a schematic view illustrating a multiple reflection evaluator used to evaluate an influence of multiple reflections between a wavelength selective member and the transparent member of the transparent solar heat absorbing apparatus.

Next, a transparent solar heat absorbing apparatus 10 and a solar cogeneration system 50 equipped with the apparatus 10B according to a second embodiment of the present invention will be explained. Note that the same components of the apparatus 10B as those of the apparatus 10A are indicated by the same reference signs, and the detailed explanation thereof will be omitted. FIG. 15 is an explanatory view for explaining the configuration of the solar cogeneration system 50. FIG. 16 is a schematic view illustrating a multiple-reflection device 70 used to evaluate an influence of multiple reflections between a transparent member and a wavelength selective member of the apparatus 10B. FIG. 17A is a schematic view illustrating a first pattern (pattern 1) of a transparent member 11P1 and a wavelength selective member 12P1 of the multiple-reflection evaluator 70. FIG. 17B is a schematic view illustrating a second pattern (pattern 2) of a transparent member 11P2 and a wavelength selective member 12P2 of the multiple-reflection evaluator 70. FIG. 17C is a schematic view illustrating a third pattern (pattern 3) of a transparent member 11P3 and a wavelength selective member 12P3 of the multiple-reflection evaluator 70. FIG. 17D is a schematic view illustrating a fourth pattern (pattern 4) of a transparent member 11P4 and a wavelength selective member 12P4 of the multiple-reflection evaluator 70. FIG. 17E is a schematic view illustrating a fifth pattern (pattern 5) of a transparent member 11P5 and a wavelength selective member 12P5 of the multiple-reflection evaluator 70.

In the apparatus 10B of FIG. 15, a transparent range of the wavelength selective member 12 is set to be shorter than 1000 nm, and a reflection range of the wavelength selective member 12B is set to be greater than 1000 nm. Apart from this, the apparatus 10B is the same as the apparatus 10A.

In the cogeneration system 50 using the apparatus 10B, a photoelectric converter 51 is disposed beneath the apparatus 10B. The photoelectric converter 51 generates power by absorbing the sunlight in a prearranged wavelength range so as to convert the sunlight into the electric energy. The photoelectric converter 51 forms a flat and rectangular parallelepiped shape and has a light receiving surface 51a at the upper side. The light receiving surface 51a of the photoelectric converter 51 is in contact with a bottom plate 16 of the apparatus 10B.

The photoelectric converter 51 may be configured by a solar cell. As the solar cell, an amorphous silicon (a-Si) solar cell, a CZTS solar cell, GaAs solar cell, a CIGS solar cell, a CdTe solar cell, a polycrystal silicon solar cell, a microcrystal silicon solar cell, or Copper Indium Selenium (CIS) solar cell may be used. In the first embodiment, the photoelectric converter 51 is configured by the CIGS solar cell. Here, the CIGS solar cell cannot generate power from the light in the wavelength approximately greater than 1000 nm. Hence, the transparent range of the wavelength selective member 12B of the apparatus 10B is set to be shorter than 1000 nm. The photoelectric converter 51 receives the sunlight by the light receiving surface 51a to generate the power and outputs the generated power to external devices (not shown) or to a distribution circuit via power lines (not shown).

The apparatus 10B of the cogeneration system 50 is connected with a first pump 31, a first temperature sensor 32, a first heat exchanger 33, a second heat exchanger 34, a second pump 35, and a bleed off valve 36 via a heating-medium circulation pipe 37. The apparatus 10B has a second temperature sensor 41 and an illuminance sensor 42. Further, the cogeneration system 50 is connected with a first water tank 43, a second water tank 44, a water-mixing valve with a thermostat 45, a water heater 46, and a water supplier 47 via a water circulation pipe 48.

Accordingly, the cogeneration system 50 can generate hot water in a similar manner to the solar water heating system 30 of the first embodiment.

Further, the cogeneration system 50 includes the photoelectric converter 51 beneath the apparatus 10B. When the sunlight is emitted to the apparatus 10B, the sunlight having the wavelength range of shorter than the transmission range passes though the wavelength selective member 12 and advances to the light receiving surface 51a of the photoelectric converter 51. The sunlight having passed through the apparatus 10B (wavelength selective member 12B) is absorbed and converted into the electric energy by the photoelectric converter 51. Accordingly, the cogeneration system 50 can obtain the power.

That is to say, the cogeneration system 50 can obtain both power and hot water by converting the sunlight (solar energy) into electric energy and thermal energy.

As explained above, the transmission range of the wavelength selective member 12B is set to be shorter than 1000 nm. Therefore, the apparatus 10B of the cogeneration system 50 cannot absorb the thermal energy from the sunlight in the wavelength range from 760 nm to 1000 nm unlike the solar water heating system 30 of the first embodiment. Nevertheless, the cogeneration system 50 can absorb as much thermal energy from the sunlight as the solar water heating system 30, as explained below.

The solar water heating system 30 absorbs the thermal energy from the sunlight having the wavelength range of greater than 760 nm, and the energy efficiency to absorb the thermal energy from the sunlight is about 22%. On the other hand, the cogeneration system 50 absorbs the thermal energy from the sunlight having the wavelength range of greater than 1000 nm, and the sunlight having the wavelength range of shorter than 1000 nm passes through the apparatus 10B (wavelength selective member 12B). The sunlight having the wavelength range of greater than 1000 nm accounts for about 28% of the total sunlight under the condition of AM1.5G. However, the sunlight having the wavelength range of shorter than 1000 nm is partially absorbed by the photoelectric converter 51 as the thermal energy. Further, the thermal energy absorbed by the photoelectric converter 51 is then absorbed by the heating medium 15 in a heating-medium reservoir 21 of a water storage space 19 through the bottom plate 16 of the apparatus 10B. The thermal energy absorbed by the heating medium 15 is approximately as much as the thermal energy absorbed by the heating tank 14 of the apparatus 10A of the first embodiment (to be specific, the energy efficiency is about 17% under the condition of AM 1.5G). Consequently, the energy efficiency of the cogeneration system 50 to absorb the thermal energy becomes about 22%.

Additionally, the cogeneration system 50 can generate the power by absorbing the sunlight having the wavelength range of shorter than 1000 nm with the photoelectric converter 51. Therefore, the cogeneration system 50 can utilize more solar energy than the solar water heating system 30.

The cogeneration system 50 can cool the photoelectric converter 51 since the photoelectric converter 51 is disposed beneath the apparatus 10B. In the apparatus 10B, the heating medium 15 exchanges the heat with the water in the first and second water tanks 43, 44 (i.e., the heat of the heating medium 15 is taken by the first and second water tanks 43, 44 through the first and second heat exchangers 33, 34). The heating medium 15 is then transferred to the heating-medium reservoir 21 of the water storage space 19. Accordingly, the heating medium 15 in the heating-medium reservoir 21 is the coolest in the heating-medium circuit 38. Further, the light receiving surface 51a of the photoelectric converter 51 is in contact with the bottom plate 16 located beneath the heating-medium reservoir 21. That is to say, the coolest heating medium 15 in the heating-medium circuit 38 absorbs the heat (heat energy) from the light-receiving surface 51a of the photoelectric converter 51 through the bottom plate 16, resulting in cooling the light receiving surface 51a (i.e., the photoelectric converter 51).

Since the cogeneration system 50 can cool the photoelectric converter 51, it becomes possible to prevent the conversion efficiency from decreasing. To be specific, as temperature of a semiconductor increases, a band gap of a semiconductor decreases. Hence, an electromotive force of the semiconductor decreases, resulting in a decrease of the conversion efficiency from the sunlight to the electric energy. The cogeneration system 50 can suppress the decrease of the conversion efficiency of the photoelectric converter 51 even in the summer.

The cogeneration system 50 can generate the multiple reflections in the heating tank 14 disposed at the upper side of the water storage space 19 of the apparatus 10B. Accordingly, the heating medium 15 can efficiently absorb the thermal energy from the sunlight. With this, the cogeneration system 50 can improve the energy conversion efficiency of the apparatus 10B. Further, since the photoelectric converter 51 is not directly in contact with the heating tank 14, it can suppress the increase of the temperature of the photoelectric converter 51. As a result, the cogeneration system 50 can prevent the conversion efficiency of the photoelectric converter 51 from decreasing.

In the cogeneration system 50, the apparatus 10B is disposed on top of the photoelectric converter 51. That is to say, the cogeneration system 50 does not require an extra space for installing the apparatus 10B. As a result, the cogeneration system 50 can effectively use the installation space of the existing photoelectric converter 51 to install the apparatus 10B. Therefore, the cogeneration system 50 can efficiently utilize the solar energy without increasing the installation space.

To be more specific, the apparatus 10B of the cogeneration system 50 is disposed on top of the light receiving surface 51a of the photoelectric converter 51. Accordingly, the cogeneration system 50 can easily be installed with the existing photoelectric converter 51.

In the cogeneration system 50, the apparatus 10B is disposed on top of the light receiving surface 51a of the photoelectric converter 51. With this, it becomes possible to protect the light receiving surface 51a with the apparatus 10B. Accordingly, the cogeneration system 50 does not need to reinforce the light receiving surface 51a, thereby achieving the simple structure and reducing the cost of the photoelectric converter 51.

In the cogeneration system 50, the apparatus 10B is disposed on top of the photoelectric converter 51, and the wavelength selective member 12B prevents the sunlight having the wavelength range other than the prearranged wavelength range (i.e., the light that is not absorbed by the photoelectric converter 51) from advancing to the photoelectric converter 51. Accordingly, the cogeneration system 50 can improve the energy conversion efficiency of the photoelectric converter 51 while avoiding a complicated structure, as explained below. For example, if the apparatus 10B is disposed beneath a photoelectric converter, the photoelectric converter may include a pair of transparent reflection plates facing each other with an acute angle and a solar cell standing at a position opposed to the intersection of the transparent reflection plates. As a result, the structure of the photoelectric converter becomes complicated disadvantageously. Further, since the solar cell needs to stand up at the position, it becomes difficult to use an existing solar cell. Furthermore, the sunlight is repeatedly reflected by the transparent reflection plates to reach the solar cell. In other words, it decreases the light intensity of the sunlight, thereby reducing the energy efficiency of the photoelectric converter. Besides, the transparent reflection plate at the upper side must be made from a transparent material. Therefore, the light intensity of the sunlight decreases, resulting in decreasing the energy conversion efficiency of the solar cell. However, since the transparent solar heat absorbing apparatus 10B of the solar cogeneration system 50 is disposed on top of the photoelectric converter 51, it becomes possible to avoid a complicated structure. Further, in the cogeneration system 50, the sunlight in the transmission range (i.e., only the light that is absorbed by the photoelectric converter 51) is allowed to pass through the wavelength selective member 12 and advances to the photoelectric converter 51. Therefore, it becomes possible to reduce the number of times the sunlight passes through the optical members, resulting in improving the energy efficiency of the photoelectric converter 51.

Figure 10:
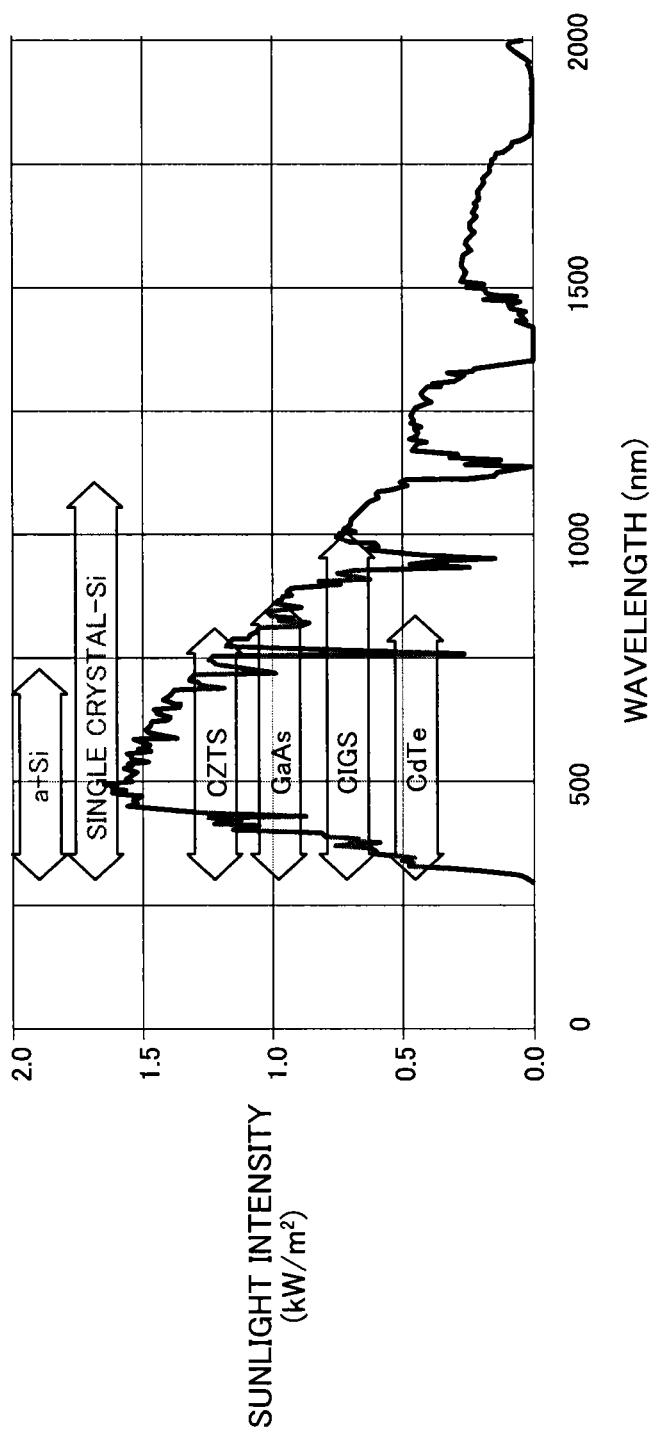
FIG. 10 is a line graph illustrating sunlight intensity distributions and sunlight absorption wavelength ranges of various solar cells.

If the apparatus 10B is disposed beneath a photoelectric converter, the photoelectric converter may use silicon so as to allow the infrared light in the sunlight to advance to a solar heat absorbing apparatus 10B. However, silicon has an extremely poor light transmissivity with respect to the light in the wavelength range between 1000 to 1200 nm. Hence, if the photoelectrical converter uses the silicon, the light in the wavelength range between 1000 and 1200 nm cannot reach the apparatus. As illustrated in FIG. 10, the sunlight includes a large amount of the light in the wavelength range between 1000 and 1200 nm. Accordingly, if the photoelectric converter is configured as mentioned above, the light in the wavelength range between 1000 nm and 1200 nm is absorbed by the silicon-made photoelectrical converter, resulting in decreasing the energy conversion efficiency. In contrary, the cogeneration system 50 according to the embodiment is configured such that the heating medium 15 in the heating tank 14 absorbs the thermal energy of the sunlight that has been reflected by the wavelength selective member 12B. Further, the cogeneration system 50 generates the electric energy from the sunlight passed through the wavelength selective member 12B by using the photoelectric converter 51. With this, the cogeneration system 50 can convert the sunlight having the wavelength range from the visible light to the infrared light into the energy, thereby improving the energy efficiency.

FIG. 16 illustrates a multiple-reflection evaluator 70 used to evaluate an influence of the multiple reflections between a transparent member 11P and a wavelength selective member 12P of the transparent solar heat absorbing apparatus according to the embodiments. The evaluator 70 measures the light intensity of the visible light outputted from a heating tank 14P so as to evaluate the influence of the multiple reflections between the transparent member 11P and the wavelength selective member 12P. Note that the multiple reflections of the visible light between the transparent member 11P and the wavelength selective member 12P and the multiple reflections of the infrared light therebetween occur in the same manner. Here, the absorption amount of the sunlight by using a heating medium 15P increases (i.e., the intensity of the light outputted from the heating tank 14P decreases) proportional to the increase of the optical path length of the sunlight inside the heating tank 14P (to be specific, in the heating medium 15P). Further, as explained above, the optical path length of the sunlight inside the heating tank 14P increases due to the multiple reflections. Accordingly, the evaluator 70 can evaluate the influence of the multiple reflections by measuring the intensity of the visible light outputted from the heating tank 14P.

The multiple reflection evaluator 70 uses a solution containing water and a black color water-based paint as the heating medium 15P. The absorption rate of the solution (heating medium 15P) for the visible light is 40% with a thickness of 1.88 mm. Since the evaluator 70 measures the intensity of the light outputted from the heating tank 14P, any wavelength selective member that can reflect the visible light is applicable to the evaluator 70. Accordingly, the wavelength selective members 12P (12P1 to 12P5) of the evaluator 70 function as mirrors. In this example, the upper surfaces of the wavelength selective members 12P1 to 12P5 illustrated in FIGS. 13A to 13E are covered with aluminum mirrors. The transparent members 11P (11P1 to 11P5) of the evaluator 70 are made from the same material as that of the transparent member 11.

As illustrated in FIGS. 13A to 13E, the multiple reflection evaluator 70 uses five combinations (first to fifth patterns) of the transparent members 11P and wavelength selective members 12P in order to measure the intensity of the light outputted from the heating tank 14P through the transparent members 11P. As illustrated in FIG. 17A, the first pattern of the evaluator 70 uses the flat-shaped transparent member 11P1 and the flat-shaped wavelength selective member 12P1. As illustrated in FIG. 17B, the second pattern of the evaluator 70 uses the triangular-wave-shaped transparent member 11P2 having the convex shapes on the upper side and the flat-shaped wavelength selective member 12P2. Here, the ridge lines of the triangular waveforms of the transparent member 11P2 extend along the left-and-right direction. Note that the transparent member 11P2 may be formed by cutting a thick transparent member. As illustrated in FIG. 17C, the third pattern of the evaluator 70 uses the triangular-wave-shaped transparent member 11P3 having the convex shapes on the upper side and the triangular-wave-shaped wavelength selective member 12P3 having the convex shapes on the upper side. Here, both of the ridge lines of the triangular waveforms of the transparent member 11P3 and the triangular waveforms of the wavelength selective member 12P3 extend along the left-and-right direction. As illustrated in FIG. 17D, the fourth pattern of the evaluator 70 uses the triangular-wave-shaped transparent member 11P4 having the convex shapes on the upper side and the triangular-wave-shaped wavelength selective member 12P4 having the convex shapes on the upper side. Here, the ridge lines of the triangular waveforms of the transparent member 11P4 extend along the left-and-right direction. In contrary, the ridge lines of the triangular waveforms of the wavelength selective member 12P4 extend along the front-and-back direction. As illustrated in FIG. 17E, the fifth pattern of the evaluator 70 uses the triangular-wave-shaped transparent member 11P5 having the convex shapes on both the upper side and lower side and the triangular-wave-shaped wavelength selective member 12P5 having the convex shapes on the upper side. Similar to the fourth pattern, the ridge lines of the triangular waveforms of the transparent member 11P5 extend along the left-and-right direction. In contrary, the ridge lines of the triangular waveforms of the wavelength selective member 12P5 extend along the front-and-back direction. Note that the fifth pattern corresponds to the configurations of the above transparent member 11 and the wavelength selective member 12. The transparent member 11P5 is formed by folding a film having the refractive index of 1.6 and of a thickness of 100 μm.

As illustrated, each of the second to fifth patterns has the waveform structure on at least one of the upper surface and the bottom surface of at least one of the transparent member 11P and the wavelength selective member 12P (i.e., corresponds to the configuration of the transparent solar heat absorbing apparatus of the embodiments of the present invention). Further, the fourth and fifth patterns show the preferable configurations of the transparent solar heat absorbing apparatus of the embodiments, i.e., the pseudo traveling directions Dt of the waveforms of the transparent members 11P4, 11P5 and of the wavelength selective members 12P4, 12P5 are respectively orthogonal to each other. That is to say, the first pattern is a comparative object relative to the configuration of the transparent solar heat absorbing apparatus of the embodiments for evaluating the influence of the multiple reflections.

The multiple reflection evaluator 70 further includes an artificial sunlight source 71, a half mirror 72, four-side mirrors 73, and an imaging device 74. The artificial sunlight source 71 emits a parallel light to the transparent member 11P along the up-and-down direction. The light intensity of the artificial sunlight source 71 is 1 kW/m$^2$. The half mirror 72 allows at least a part of the parallel light emitted from the artificial sunlight source 71 to pass through. Further, the half mirror 72 reflects a part of the light reflected from the transparent member 11P to the imaging device 74. Note that the half mirror 72 of this embodiment uses a "Chromium Plate Half Mirror" manufactured by SIGMA KOKI Co. Ltd. Both the transmissivity and reflectivity of the half mirror are about 50%.

The four-side mirrors 73 are made of aluminum and surround the transparent member 11P and wavelength selective member 12P. The four-side mirrors 73 prevent the parallel light emitted to the transparent member 11 from leaking outside and guide the light reflected by the transparent member 11P to the imaging device 74 through the half mirror 72. The imaging device 74 captures images of the transparent member 11P through the half mirror 72.

Further, the gap between the transparent member 11P and the wavelength selective member 12P of the evaluator 70 are adjusted such that the capacity of the heating tank 14P becomes 1.8 L/m$^2$ for each pattern. The heating tank 14P of the evaluator 70 is filled with the heating medium 15 containing the black color water-based paint.

In the evaluator 70, the artificial sunlight source 71 emits the light through the transparent member 11P, wavelength selective member 12P, and heating tank 14P in each pattern. The imaging device 74 then captures images of the transparent member 11P projected on the half mirror 72. Only the light that cannot be totally reflected by the transparent member 11P to return to the wavelength selective member 12P is emitted outside and captured by the imaging device 74. Accordingly, the evaluator 70 can evaluate the influence of the multiple reflections between the transparent member 11P and the wavelength selective member 12P by calculating the light intensity in the image captured by the imaging device 74.

In this example, the evaluator 70 calculates the light intensity in the captured image by calculating average gradation values of the entire image with image processing software. The gradation values are expressed in 256 gradations. The value 0 (zero) represents black, while the value 255 represents white. Hence, the smaller value represents a darker image, i.e., indicates that the light absorption amount of the heating medium 15P in the heating tank 14P is greater. In this example, the imaging condition of the imaging device 74 is adjusted such that the gradation value becomes 233 when the heating tank 14P is filled with only water (i.e., when the heating medium 15P inside the heating tank 14P does not contain the black color water-based paint). Note that the imaging condition can be adjusted by changing the shutter speed and/or F-value of the imaging device 74 or by using a Neutral Density (ND) filter. As is known, more halation occurs as the gradation values become greater. The imaging condition is, therefore, set as explained above to avoid measurement errors caused by halation.

By using the calculated gradation values as relative values to the energy, the evaluator 70 calculates an approximate curve based on the following method. The energy ratio of an image with the gradation value 233 is defined as 1 (one). By calculating the gradation values at the shutter speeds of 1/100, 1/125, 1/200, 1/250, 1/400, 1/500, and 1/1000, and plotting the calculated values in a graph of the gradation values versus energy ratios, the following approximate equation is introduced. Note that the energy ratio between the energy at shutter speed 1/1000 and the energy at shutter speed 1/100 is 0.1.

$$\text{Energy ratio} = 0.01 \exp(0.019687 \times (\text{gradation value}))$$

The following table shows the calculated gradation values and corresponding energy ratio determined by the above approximate equation for each pattern (first to fifth patterns illustrated in FIGS. 17A to 17E).

Therefore, by setting the pseudo traveling direction Dt of the transparent member 11P to be orthogonal to that of the wavelength selective member 12P, the apparatus having the preferable configuration can generate even more multiple reflections compared to the apparatuses having other configurations.

That is to say, the apparatus can secure a long optical path in the heating tank 14P. As a result, the apparatus can efficiently absorb the thermal energy from the sunlight by filling the heating tank 14P with the heating medium 15P.

Consequently, the solar heat absorbing apparatus 10B of the embodiments of the present invention can efficiently absorb the thermal energy from the sunlight by allowing a part of the sunlight to pass through the apparatus while reducing the weight of the apparatus 10B.

Embodiment 3

Figure 18:
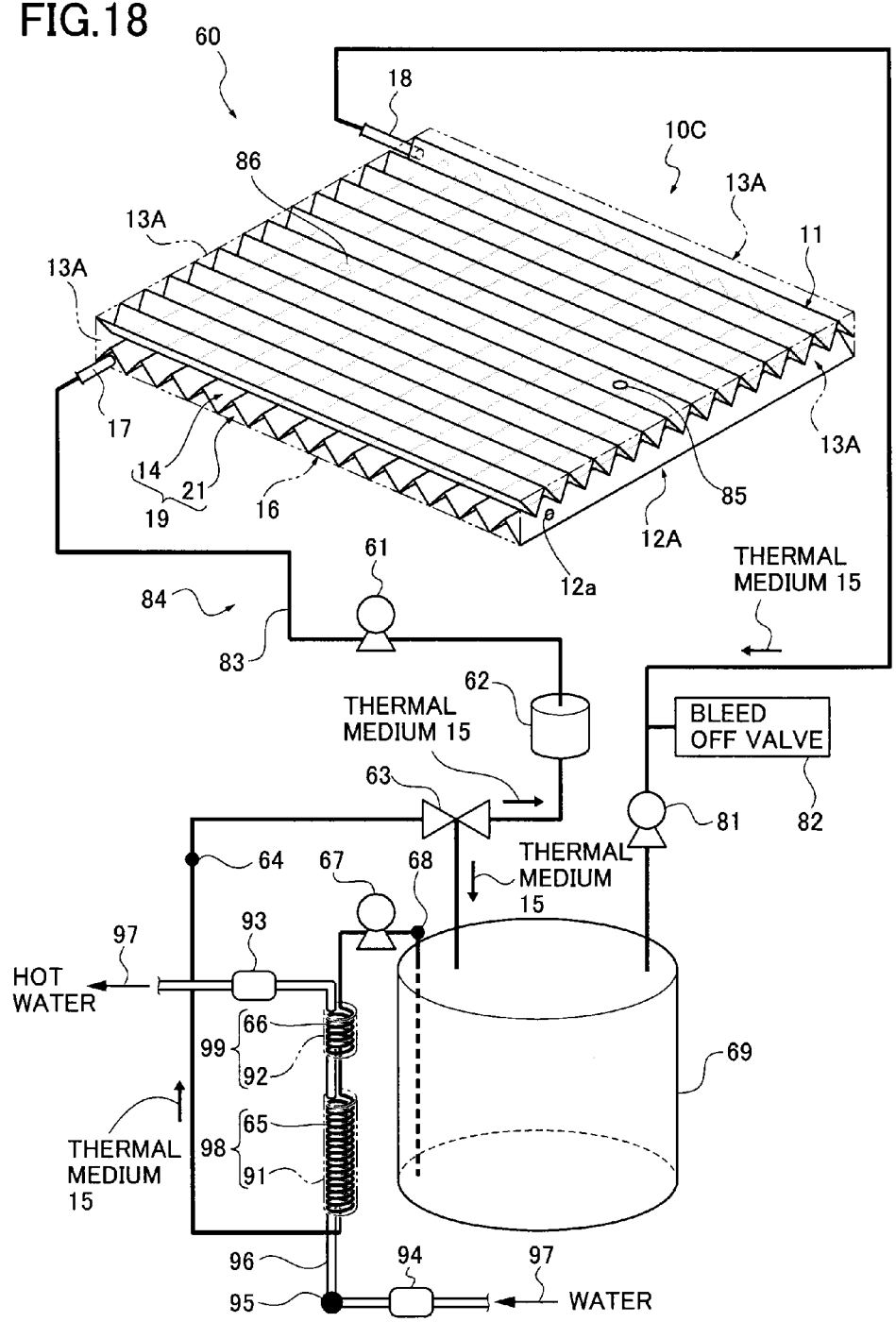
FIG. 18 is a schematic view illustrating an overall configuration of a solar water heating system of a third embodiment.
Figure 19:
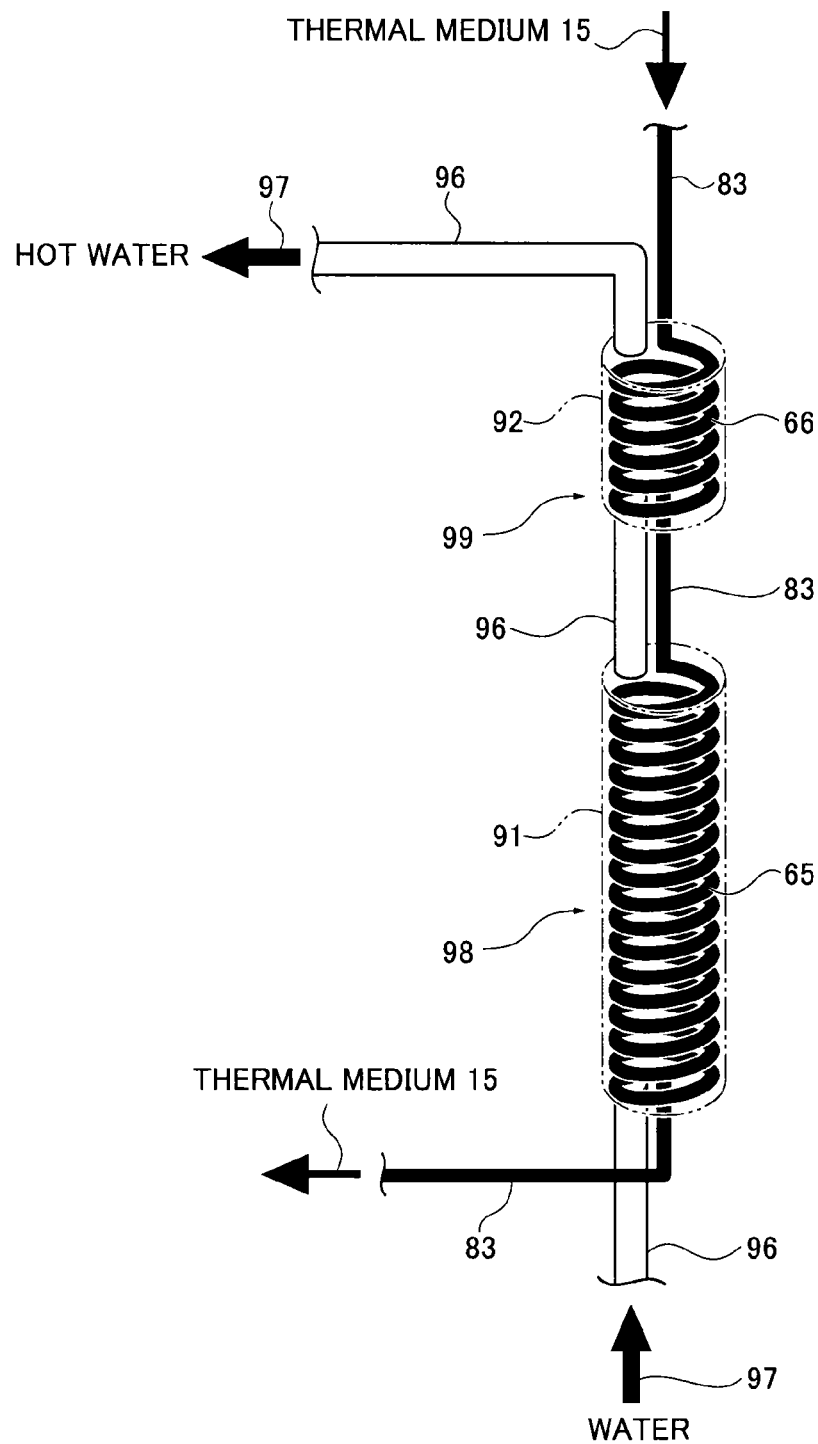
FIG. 19 is a partial enlarged view illustrating a preheater and a heater of the solar water heating system of the third embodiment.
Figure 20:
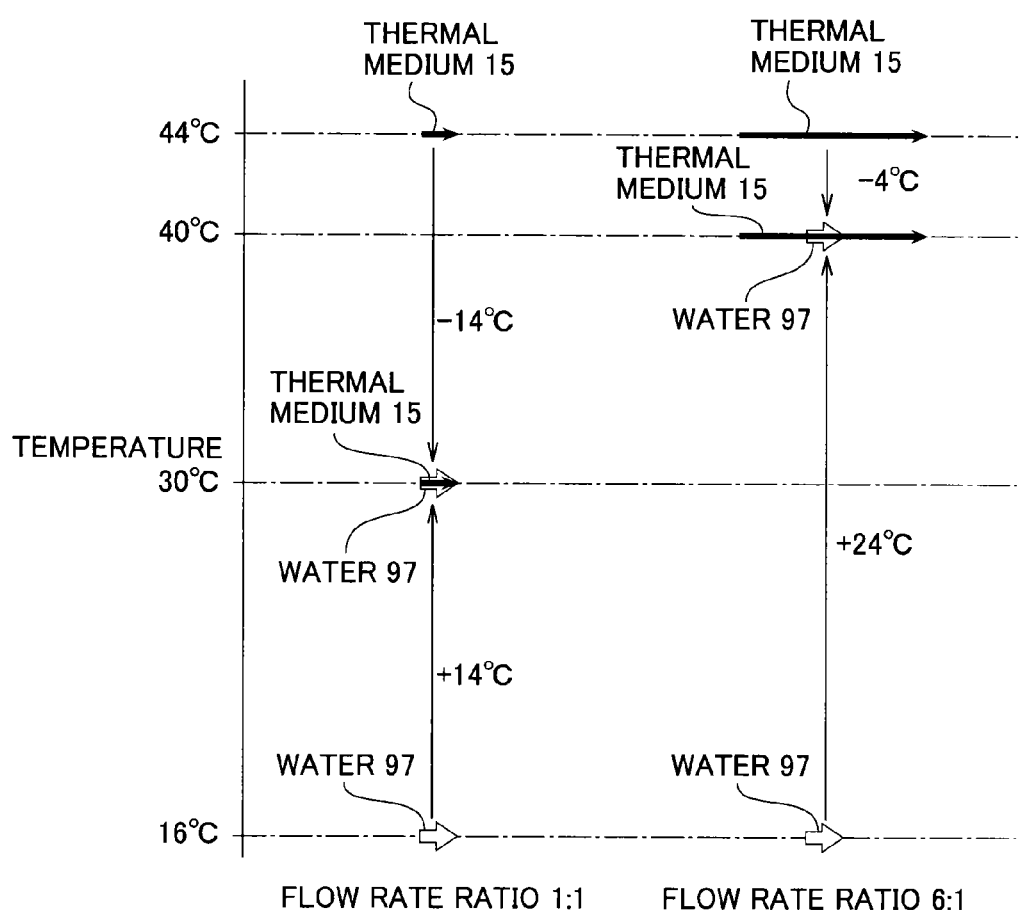
FIG. 20 is an explanatory view illustrating examples for controlling temperature of water outputted from the solar water heating system of the third embodiment.

Next, a transparent solar heat absorbing apparatus 10C and a solar water heating system 60 equipped with the apparatus 10C according to a third embodiment of the present invention will be explained. Note that the same components of the apparatus 10C as those of the apparatus 10A are indicated by the same reference signs, and the detailed explanation thereof will be omitted. FIG. 18 is an explanatory view illustrating the configuration of the solar water heating system 60. FIG. 19 is a partial enlarged view illustrating a preheater 98 and a heater 99 of the solar water heating system 60. FIG. 20 is an explanatory view illustrating examples for controlling temperature of water outputted from the solar water heating system of the third embodiment.

As illustrated in FIG. 18, the apparatus 10C of the solar water heating system 60 is connected with a first small-sized pump 61, a low-temperature heating medium tank 62, an

| PATTERN | PATTERN 1 | PATTERN 2 | PATTERN 3 | PATTERN 4 | PATTERN 5 |
| --- | --- | --- | --- | --- | --- |
| GRADATION VALUE | 198.8 | 179.5 | 188.2 | 156.6 | 124.9 |
| ENERGY RATIO | 0.50 | 0.34 | 0.41 | 0.22 | 0.12 |

As shown in the table, the gradation values and energy ratios of the second to fifth patterns, which show the configurations of the apparatus according to the embodiments of the present invention, are smaller than those of the first pattern. That is to say, the numbers of times of the multiple reflections between the transparent members 11P and wavelength selective members 12P in the second to fifth patterns are greater than those in first pattern. Therefore, by having the similar configuration of the solar heat absorbing apparatus of the embodiments (i.e., by having the waveform structure on at least one of the upper surface and the bottom surface of at least one of the transparent member 11P and the wavelength selective member 12P), the apparatuses having the configurations of the second to fifth patterns can generate more multiple reflections compared to that of the first pattern.

Especially, the gradation values and energy ratios of the fourth and fifth patterns, which show the preferable configurations of the apparatus according to the embodiments of the present invention, are smaller than those of the first to third patterns. That is to say, the numbers of times of the multiple reflections between the transparent member 11P and wavelength selective member 12P in the fourth and fifth patterns are greater than those in first to third patterns.

electromagnetic valve 63, a first temperature sensor 64, a first heat exchanger 65, a second heat exchanger 66, a heating-medium transfer pump 67, a first flow-rate/temperature sensor 68, a high-temperature heating medium tank 69, a second small-sized pump 81, and a bleed off valve 82 via a heating-medium circulation pipe 83. Note that the first small-sized pump 61, the low-temperature heating medium tank 62, the electromagnetic valve 63, the first temperature sensor 64, the first heat exchanger 65, the second heat exchanger 66, the heating-medium transfer pump 67, the first flow rate sensor 68, the high-temperature heating medium tank 69, the second small-sized pump 81, and the bleed off valve 82 form a heating-medium circuit 84 together with a water storage space 19 (heating tank 14 and heating-medium reservoir 21).

In the water heating system 60, an inlet of the apparatus 10C is connected with the first small-sized pump 61 via the heating-medium circulation pipe 83. The first small-sized pump 61 is connected with the low-temperature heating medium tank 62 via the heating-medium circulation pipe 83. The first small-sized pump 61 sends the heating medium 15 from the low-temperature heating medium tank 62 to the heating-medium reservoir 21 through the inlet 17.

The low-temperature heating medium tank 62 stores the heating medium 15 having lower temperature than a prearranged temperature. The low-temperature heating medium tank 62 is covered with thermal insulating materials or the like, so as to secure the heat storage property. The low-temperature heating medium 15 is connected with the electromagnetic valve 63 via the heating-medium circulation pipe 83. By controlling the electromagnetic valve 63, the system 60 sends the heating medium 15 having lower temperature than the prearranged temperature to the low-temperature heating medium tank 62.

The electromagnetic valve 63 is connected with the first heat exchanger 65 via the heating-medium circulation pipe 83. The first temperature sensor 64 detects the temperature of the heating medium 15 between the electromagnetic valve 63 and the first heat exchanger 65. The electromagnetic valve 63 is connected with the low-temperature heating medium tank 62 and high-temperature heating medium tank 69 via the heating-medium circulation pipe 83. The electromagnetic valve 63 selectively switches a flow path from the first heat exchanger 65 to the low-temperature heating medium tank 62 and a flow path from the first heat exchanger 65 to the high-temperature heating medium tank 69 (i.e., selectively flows the heating medium 15 from the first heat exchanger 65 to the low-temperature heating medium tank 62 or to the high-temperature heating medium tank 69). The electromagnetic valve 63 switches the flow paths in accordance with temperature of the heating medium 15 detected by the first temperature sensor 64. Specifically, the electromagnetic valve 63 connects the flow path from the first heat exchanger 65 to the low-temperature heating tank 62 when the temperature of the heating medium 15 is lower than the prearranged temperature. On the other hand, the electromagnetic valve 63 connects the flow path from the first heat exchanger 65 to the high-temperature heating medium tank 69 when the detected temperature is equal to or higher than the prearranged temperature. As a result, the heating medium 15 having lower temperature than the prearrange temperature is stored in the low-temperature heating medium tank 62, while the heating medium 15 having equal to or higher temperature than the prearranged temperature is stored in the high-temperature heating medium tank 69.

As illustrated in FIG. 19, the first heat exchanger 65 is connected with the second heat exchanger 66 via the heating-medium circulation pipe 83. The first and second heat exchangers 65, 66 are formed by helically winding an elongated tube and exchange the heat between the heating medium 15 and water 97 passing through first and second heat-exchange tanks 91, 92. Since the heating medium 15 is heated in the heating tank 14 of the water storage space 19, the first and second heat exchangers 65, 66 can increase the temperature of water 97 passing through the first and second heat-exchange tanks 91, 92 by using the heat of the heating medium 15.

As illustrated in FIG. 18, the second heat exchanger 66 is connected with the heating-medium transfer pump 67 via the heating-medium circulation pipe 83. The heating-medium transfer pump 67 is connected with the high-temperature heating medium tank 69 via the heating-medium circulation pipe 83. The first flow-rate/temperature sensor 68 detects the temperature and flow rate of the heating medium 15 flowing from the high-temperature heating medium tank 69 to the heating-medium transfer pump 67. By controlling the heating-medium transfer pump 67 based on the detection results of the first flow-rate/temperature sensor 95 and a second flow-rate/temperature sensor 95 (explained later), the system 60 adjusts the temperature of the water 97 outputted from the system 60. The heating-medium transfer pump 67 transfers or sends the heating medium 15 from the high-temperature heating medium tank 69 to the second heat exchanger 66, and the flow rate of the heating medium 15 is adjusted by the pump 67.

The high-temperature heating medium tank 69 is covered with the thermal insulating materials or the like, so as to secure the heat storage property. As explained above, the high-temperature heating medium tank 69 stores the heating medium 15 having equal to or higher temperature than the prearranged temperature. Further, the heating medium 15 heated in the heating tank 14 of the apparatus 10C is sent to the high-temperature heating medium tank 69 by the second small-sized pump 81 through the heating-medium circulation pipe 83. Here, the heating-medium circulation pipe 83 connected with the second small-sized pump 81 and the heating-medium circulation pipe 83 connected with the electromagnetic valve 63 are connected to the upper part of the high-temperature heating medium tank 69. Further, the heating-medium circulation pipe 83 connected with the heating-medium transfer pump 67 is led to the bottom part of the high-temperature heating medium tank 69.

The second small-sized pump 81 sends the heating medium 15 from the heating tank 14 of the apparatus 10C to the high-temperature heating medium tank 69 through the outlet 18. The bleed off valve 82 is provided on the heating-medium circulation pipe 83 between the outlet 18 and the second small-sized pump 81 for bleeding off gas (air) from the heating-medium circulation pipe 83 (i.e., the heating-medium circuit 84).

Further, the apparatus 10C includes an illuminance sensor 85 and a second temperature sensor 86 as a part of the solar water heating system 60. The illuminance sensor 85 detects a light intensity (intensity of the sunlight) at the transparent member 11 of the apparatus 10C. The second temperature sensor 86 detects the temperature of the heating medium 15 inside the heating tank 14 (i.e., the temperature of the heating medium 15 that has absorbed the thermal energy from the sunlight).

In the system 60, the first and second heat-exchange tanks 91, 92, a water heater 93, a water supplier 94, and the second flow-rate/temperature sensor 95 are connected via a water circulation pipe 96. The water supplier 94 is connected with the first heat-exchange tank 91 via the water circulation pipe 96 and supplies the water 97 to the first heat-exchange tank 91. Note that the water supplier 94 is adapted to supply tap-water in the third embodiment.

The first heat-exchange tank 91 is of a cylindrical shape and allows the water 97 supplied from the water supplier 94 to flow thorough the tank 91. Further, the first heat-exchange tank 91 accommodates the first heat exchanger 65 (see FIG. 19). Accordingly, the water 97 supplied from the water supplier 94 exchanges the heat with the first heat exchanger 65 in the first heat-exchange tank 91. The first heat-exchange tank 91 is connected with the second heat-exchange tank 92 via the water circulation pipe 96.

The second heat-exchange tank 92 forms a cylindrical shape and allows the water 97 (hot water) heated in the first heat-exchange tank 91 to flow through the tank 92. Further, the second heat-exchange tank 92 accommodates the second heat exchanger 66 (see FIG. 19). Accordingly, the water 97 sent from the first heat-exchange tank 91 exchanges the heat with the second heat exchanger 66 in the second heat-exchange tank 92.

In the system 60, the first heat-exchange tank 91 preheats the water 97 (tap-water) supplied from the water supplier 94 with the heating medium 15, which exchanges the heat with the water 97 in the second heat-exchange tank 92 through the second heat exchanger 66. The second heat-exchanger tank 92 further heats the water 97 (tap-water), which has been preheated in the first heat-exchange tank 91 with the heating medium 15. Here, the heating medium 15 flowing from the high-temperature heating medium tank 69 has the highest temperature (i.e., the heating medium 15 flowing in the second heat exchanger 66 is the hottest). That is to say, the first heat exchanger 65 and the first heat-exchange tank 91 function as the preheater 98, and the second heat exchanger 66 and the second heat-exchange tank 92 function as the heater 99. The second heat-exchange tank 92 is connected with the water heater 93 via the water circulation pipe 96.

The water heater 93 heats the water 97 (hot water) supplied from the second heat-exchange tank 92 to a target temperature and outputs it to a user through the water circulation pipe 96. Here, the water heater 93 outputs the water 97 without heating when the temperature of the water 97 supplied from the second heat-exchange tank 92 is at the target temperature. On the other hand, the water heater 93 outputs the water 97 after heating the water 97 to the target temperature when the temperature of the water 97 supplied from the second heat-exchange tank 92 is lower than the target temperature. Note that the target temperature is set by the user. In the third embodiment, the water heater 93 is a gas water heater.

The second flow-rate/temperature sensor 95 is provided on the water circulation pipe 96 between the water supplier 94 and the first heat-exchange tank 91. The second flow-rate/temperature sensor 95 is adapted to detect the temperature and the flow rate of the water 97 flowing through the water circulation pipe 96. By controlling the heating-medium transfer pump 67 based on the detection results of the first and second flow-rate/temperature sensors 68, 95, the system 60 adjusts the temperature of the water 97 outputted from the system 60.

Also, the system 60 determines whether it is possible to heat the heating medium 15 in the heating tank 14 of the apparatus 10C based on the light intensity detected by the illuminance sensor 85. When the determination result is affirmative, the system 60 drives the first small-sized pump 61 to send the heating medium 15 to the heating-medium reservoir 21 (and to the heating tank 14) of the water storage space 19. The heating medium 15 sent to the water storage space 19 then absorbs the thermal energy from the sunlight in the heating tank 14 thereof. The heating medium 15 remains in the heating tank 14 or continuously and gradually flows in the heating tank 14 so as to sufficiently absorb the thermal energy from the sunlight. Further, the system 60 sends the heating medium 15 from the heating tank 14 to the high-temperature heating medium tank 69 by the second small-sized pump 81 when the temperature of the heating medium 15 detected by the second temperature sensor 86 reaches a preset temperature. Accordingly, the high-temperature heating medium tank 69 stores the heating medium 15 having equal to or higher temperature than the preset temperature. Note that in the third embodiment, the preset temperature and the prearranged temperature are the same. However, it should not be limited thereto. The preset temperature and the prearranged temperature may be different from each other.

In the system 60, the heating medium 15 stored in the high-temperature heating medium tank 69 is sent to the second heat exchanger 66 and the first heat exchanger 65 by the heating-medium transfer pump 67. The system 60 then heats the water 97 supplied from the water supplier 94 with the first and second heat exchangers 65, 66 in the first and second heat-exchange tanks 91, 92.

The system 60 outputs the heated water 97 (hot water). Specifically, the system 60 heats the water 97 (tap-water) supplied from the water supplier 94 by the preheater 98 and heater 99 to the target temperature and outputs it from the heater 99 (i.e., the second heat-exchange tank 92). In other words, the system 60 is not configured to first generate the hot water to be supplied and store the generated hot water in a tank. As explained below, the system 60 adjusts or controls the temperature of the water 97 outputted from the second heat-exchange tank 92 to the target temperature by adjusting or controlling the flow rate of the heating medium sent to the first and second heat exchangers 65, 66.

As explained above, the target temperature is set by the user in advance. The temperature and the flow rate of the water 97 (tap-water) supplied from the water supplier 94 to the first heat-exchange tank 91 are detected by the second flow-rate/temperature sensor 95. The temperature and the flow rate of the heating medium 15 sent from the high-temperature heating medium tank 69 to the second heat exchanger 66 are detected by the first flow-rate/temperature sensor 68. In order to output the water 97 at the target temperature from the second heat-exchange tank 92, the system 60 determines the flow rate of the heating medium 15 sent to the second heat exchanger 66 based on the temperature and flow rate of the water 97 (tap-water) supplied to the second heat-exchange tank 92 as well as the temperature of the heating medium 15 sent from the high-temperature heating medium tank 69. FIG. 20 shows examples for setting the flow rate of the heating medium 15.

In the examples shown in FIG. 20, the specific heat of the heating medium 15 is the same as that of the tap-water (water 97), i.e., 1 (cal/degree C.·g). Further, the heat exchange efficiencies between the heating medium 15 and water 97 at the preheater 98 and heater 99 are assumed to be 100%. Also, the volume of the heating medium 15 inside the first and second heat exchangers 65, 66 is assumed to be the same as the volume of the water 97 inside the first and second heat-exchange tanks 91, 92. Here, the temperature of the water 97 (tap-water) supplied to the first heat-exchange tank 91 is 16 degree C., the temperature of the heating medium 15 sent to the second heat exchanger 66 is 44 degree C., and the target temperature is 40 degree C.

In one of the examples, the flow rate of the heating medium 15 sent to the second heat exchanger 66 is set to be the same as that of the water 97 (tap-water) supplied to the first heat-exchange tank 91 (i.e., the flow rate of the heating medium 15:the flow rate of the water 97=1:1). As is known, the temperatures of the heating medium 15 and water 97 change in accordance with the inverse of the ratio between the flow rates of the heating medium 15 and water 97. Hence, the change amounts of the temperatures of the heating medium 15 and water 97 also become the same. Accordingly, the temperature of the heating medium 15 decreases by 14 degree C. (a half of the temperature difference between the heating medium 15 and water 97, i.e., (44−16)/2=14), while the temperature of the water 97 increases by 14 degree C. As a result, the temperature of the water 97 outputted from the heater 99 (i.e., the second heat-exchange tank 92) becomes 30 degree C. That is to say, the temperature is still lower than the target temperature (40 degree C.).

In the other example, the flow rate of the heating medium 15 sent to the second heat exchanger 66 is set to be six times faster than that of the water 97 (tap-water) supplied to the first heat-exchange tank 91 (i.e., the flow rate of the heating medium 15:the flow rate of the water 97=6:1). Accordingly, the temperature of the heating medium 15 decreases by 4 degree C. (one-seventh of the temperature difference between the heating medium 15 and water 97, i.e., (44−16)/7=4), while the temperature of the water 97 increases by 24 degree C. (six-seventh of the temperature difference). As a result, the temperature of the water 97 outputted from the heater 99 (i.e., the second heat-exchange tank 92) becomes as high as the target temperature, 40 degree C.

Therefore, in this example, the system 60 controls the heating-medium transfer pump 67 such that the flow rate of the heating medium 15 supplied to the second heat exchanger 66 becomes sixth times faster than that of the water 97 sent to the first heat-exchange tank 91. With this, the system 60 can output (supply) the water 97 at the target temperature (40 degree C.) from the heater 99 (i.e., the second heat-exchange tank 92).

As explained above, the system 60 controls and changes the flow rate ratio between the heating medium 15 and the water 97 (tap-water) based on the conditions of the specific heat of the heating medium 15, heat exchange efficiencies of the preheater 98 and heater 99, temperature of the heating medium 15 and water 97, and the like. With this, the system 60 can adjust the temperature of the water 97 outputted from the heater 99 (i.e., the second heat-exchange-tank 92). Further, if the system 60 is unable to increase the temperature of the water 97 outputted from the second heat-exchange tank 92 to the target temperature, the system 60 drives the water heater 93 to further heat the water.

The solar water heating system 60 of the third embodiment can obtain hot water by utilizing the sunlight while allowing a part of the sunlight to pass through the transparent solar heat absorbing apparatus 10C.

Note that the apparatus 10C of the third embodiment has almost the same configurations as that of the apparatus 10 of FIG. 1. Therefore, the apparatus 10C has the similar advantageous effects to that of the apparatus 10.

The system 60 can be optimally designed to achieve an efficient heat exchange with the first and second heat exchangers 65, 66 in the first and second heat-exchange tanks 91, 92. With this, the system 60 can efficiently generate the hot water.

Further, the system 60 can be optimally designed to suppress an increase of the area of the heating tank 14 while efficiently exchanging heat with the first and second heat exchangers 65, 66 in the first and second heat-exchange tanks 91, 92. With this, the system 60 can efficiently generate the hot water while saving the space.

In the system 60, it is possible to install the apparatus 10C on a transparent roof of a balcony, which is used for daylighting and rain cover, or on a balcony with a glass handrail, or the like. As a result, the installation places of the apparatus 10 become more selectable while utilizing thermal energy from the sunlight to obtain hot water. That is to say, the system 60 can achieve both daylighting and generating hot water.

The system 60 heats the water 97 (tap-water) to the target temperature with the heater 99 after preheating the water 97 with the preheater 98 and outputs (supplies) the hot water from the heater 99 (i.e., the second heat-exchange tank 92). With this, the system 60 can improve the heat exchange efficiency. To be specific, in the system 60, the preheater 98 preheats the water 97 supplied from the water supplier 94 with the heating medium 15 that has exchanged heat with the water 97 in the second heat-exchange tank 92, and the heater 99 further heats the water 97, which has been heated by the preheater 98, with the hottest heating medium 15 sent from the high-temperature heating medium tank 69. As a result, the system 60 can further improve the heat exchange efficiency.

The system 60 heats the water 97 (tap-water) supplied from the water supplier 94 with the heating medium 15 stored in the high-temperature heating medium tank 69 and outputs the heated water 97 from the second heat-exchange tank 92 upon receiving a request from the user. That is to say, the system 60 is not configured to generate and store the hot water in advance. Hence, the system can suppress an energy loss with a simple structure, i.e., the system can suppress the energy loss while suppressing the manufacturing cost, as explained below.

Generally, when a solar water heating system is configured to heat water by using thermal energy absorbed by a solar heat absorbing apparatus and to store the heated water in a water tank, the temperature of the water stored in the water tank may be set to about 40 degree C. to suppress the energy loss caused by heat radiation. However, since the water at about 40 degree C. may encourage bacteria, such as legionella, to breed, the system will need to have an anti-bacteria mechanism. To prevent bacteria from breeding, the system may increase the temperature of the water stored in the water tank to about 60 degree C., resulting in increase of the energy loss. In contrary, since the system 60 of the third embodiment is configured to store the high temperature heating medium 15 (i.e., not the water to be supplied) in the high-temperature heating medium tank 69, the system 60 does not need to have an anti-bacteria mechanism for processing the heating medium 15 at the temperature of about 40 degree C.

When a solar water heating system is configured to store heated water in a water tank in advance, it is required to regularly clean the water tank to remove water stain and the like. However, since the system 60 of the third embodiment is configured to supply the water 97 to the first and second heat-exchange tanks 91, 92 upon receiving a request from the user (i.e., only when the user requires the hot water), it can prevent the occurrence of the water stain. As a result, the system 60 can reduce the running cost even when the water 97 outputted from the system 60 is used as drinking water.

Note that although the solar water heating system 60 of the third embodiment is equipped with the transparent solar heat absorbing apparatus 10C, it should not be limited thereto. Any apparatus that can increase the temperature of a heating medium 15 can be applied to the system 60. For example, a solar heat absorbing panel may be used instead of the solar heat absorbing apparatus, or the transparent solar heat absorbing apparatus may be used together with the photoelectric converter 51 as explained in the second embodiment.

In the above explanation, the solar heat absorbing apparatus of the embodiments is exemplarily applied to the solar water heating system 30, the solar cogeneration system 50, and the solar water heating system 60. However, it should not be limited thereto. For example, the apparatus may use the heating medium 15 itself as the hot water when the heating medium 15 is water.

In the first and second embodiments, the solar water heating system 30 and the solar cogeneration system 50 include the first and second heat exchangers 33, 34 and the first and second water tanks 43, 44 separately. However, it should not be limited thereto. The numbers of the heat exchangers and that of the water tanks may be single or more than two.

In the first and second embodiments of the present invention, the transparent member (11, etc.) and the wavelength selective member (12, etc.) are disposed such that the pseudo traveling directions Dt of the transparent member (11, etc.) and the wavelength selective member (12, etc.) are orthogonal to each other. However, it should not be limited thereto. The pseudo traveling directions Dt may be substantially orthogonal to each other. To be specific, the transparent member can be used to adjust the angle of the reflective sunlight Rr as viewing from a first surface orthogonal to the horizontal surface. On the other hand, the wavelength selective member can be used to adjust the angle of the reflective sunlight Rr as viewing from a second surface orthogonal to the horizontal surface and orthogonal to the first surface.

In the second embodiment, the fourth and fifth patterns show preferable examples of the transparent solar heat absorbing apparatus of the embodiments. However, the arrangement of the apparatus should not be limited thereto. In the apparatus of the embodiments, each of the transparent member 11 and the wavelength selective member 12 has the waveform structure on at least one of the corresponding upper surface and bottom surface. Further, the pseudo traveling directions Dt are orthogonal to each other. Here, the interface at which the total reflection occurs is changed based on the refractive indexes of the transparent member and the heating medium. As long as the interface has the waveform structure, the structure should not be limited thereto. For example, when the refractive index of the transparent member is smaller than that of the heating medium 15, the bottom surface of the transparent member may have the waveform structure.

Although the present invention has been described in terms of exemplary embodiments, it is not limited thereto. It should be appreciated that variations or modifications may be made in the embodiments described by persons skilled in the art without departing from the scope of the present invention as defined by the following claims.

What is claimed is:

1. A transparent solar heat absorbing apparatus comprising:
    a transparent member that allows sunlight to pass through;
    a wavelength selective member disposed beneath the transparent member, the wavelength selective member allowing light in a transmission range including at least a visible wavelength range to pass through and reflecting light in a reflection range including at least an infrared wavelength range; and
    a heating tank formed between the transparent member and the wavelength selective member, the heating tank being filled with a heating medium,
    wherein at least one of the transparent member and the wavelength selective member has a waveform structure on at least one of its upper surface and bottom surface;
    wherein the transparent member has the waveform structure on at least one of the upper surface and the bottom surface of the transparent member in a first cross sectional view, and a pseudo traveling direction of the waveform structure of the transparent member is a first direction, and
    wherein the wavelength selective member has the waveform structure on at least one of the upper surface and the bottom surface of the wavelength selective member in a second cross sectional view, and a pseudo traveling direction of the waveform structure of the wavelength selective member faces to a second direction substantially orthogonal to the first direction.

2. The apparatus as claimed in claim 1, wherein the transparent member has the waveform structures on both the upper surface and the bottom surface of the transparent member.

3. The apparatus as claimed in claim 2, wherein the transparent member is formed by folding a flat plate member that allows the sunlight to pass through.

4. The apparatus as claimed in claim 1, wherein the first direction of the transparent member is oriented to a south-and-north direction, and
    wherein the second direction of the wavelength selective member is oriented to an east-and-west direction.

5. The apparatus as claimed in claim 1, wherein the wavelength selective member is formed by covering a material that allows the sunlight to pass through with a dielectric multilayer film.

6. The apparatus as claimed in claim 1, wherein the wavelength selective member is formed by covering a material that allows the sunlight to pass through with a coating film of silver iodide tabular grains.

7. The apparatus as claimed in claim 1, wherein the heating medium is water or fluid containing water.

8. The apparatus as claimed in claim 1, wherein the transmission range of the wavelength selective member is set to be the visible wavelength range, and the reflection range of the wavelength selective member has a greater wavelength range than the transmission range.

9. The apparatus as claimed in claim 1, further including a photoelectric converter that is disposed beneath the wavelength selective member, the photoelectric converter receiving the sunlight by a light receiving surface and converting the received sunlight into electric energy,
    wherein the transmission range of the wavelength selective member is set to be a wavelength range in which the photoelectric converter converts the sunlight into the electric energy, and the reflection range of the wavelength selective member has a greater wavelength range than the transmission range.

10. A solar water heating system comprising:
    the transparent solar heat absorbing apparatus as claimed in claim 8;
    a heat exchanger that is connected with the heating tank of the apparatus and receives the heating medium from the heating tank;
    a water tank that accommodates the heat exchanger and stores water; and
    a water heater that supplies hot water by heating the water stored in the water tank.

11. A solar cogeneration system comprising:
    the transparent solar heat absorbing apparatus including the photoelectric converter as claimed in claim 9;
    a heat exchanger that is connected with the heating tank of the apparatus, the heating medium being sent to the heat exchanger from the heating tank;
    a water tank that accommodates the heat exchanger and stores water; and
    a water heater that supplies hot water by heating the water stored in the water tank.

12. A solar water heating system, comprising:
    the transparent solar heat absorbing apparatus as claimed in claim 8;
    a heating medium tank that is connected with the heating tank, the heating medium tank storing the heating medium sent from the heating tank;
    a heat exchanger that is connected with the heating medium tank, the heating medium being sent to the heat exchanger from the heating medium tank;

a heat-exchange tank that accommodates the heat exchanger and allows water to flow inside the heat-exchange tank; and a heating medium transfer pump that adjusts a flow rate of the heating medium sent to the heat exchanger, wherein the heating medium transfer pump adjusts the flow rate based on temperature and a flow rate of water supplied to the heat-exchange tank to increase the temperature of the water outputted from the heat-exchange tank to a target temperature.

* * * * *